US012410350B2

(12) United States Patent
Kim et al.

(10) Patent No.: US 12,410,350 B2
(45) Date of Patent: Sep. 9, 2025

(54) SYSTEMS AND METHODS FOR DUST CONTROL USING A LIQUID POLYMER

(71) Applicant: Arizona Board of Regents on Behalf of the University of Arizona, Tucson, AZ (US)

(72) Inventors: Minkyu Kim, Tucson, AZ (US); Kwangmin Kim, Tuscon, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 418 days.

(21) Appl. No.: 16/755,510

(22) PCT Filed: Oct. 11, 2018

(86) PCT No.: PCT/US2018/055466
§ 371 (c)(1),
(2) Date: Apr. 10, 2020

(87) PCT Pub. No.: WO2019/075237
PCT Pub. Date: Apr. 18, 2019

(65) Prior Publication Data
US 2022/0332995 A1    Oct. 20, 2022

Related U.S. Application Data

(60) Provisional application No. 62/571,115, filed on Oct. 11, 2017.

(51) Int. Cl.
*C09K 3/22* (2006.01)
*C08L 71/02* (2006.01)
*C08L 71/10* (2006.01)

(52) U.S. Cl.
CPC ............... *C09K 3/22* (2013.01); *C08L 71/02* (2013.01); *C08L 71/10* (2013.01)

(58) Field of Classification Search
CPC . C09K 3/22; C08L 71/02; C08L 71/10; C08L 2201/54; C08F 20/16; C08F 20/34
See application file for complete search history.

(56) References Cited

U.S. PATENT DOCUMENTS

| | | | | |
|---|---|---|---|---|
| 4,136,050 A | * | 1/1979 | Brehm | C09K 3/22 95/149 |
| 2002/0025382 A1 | * | 2/2002 | Hawkins | C09K 17/14 523/132 |
| 2015/0299545 A1 | * | 10/2015 | Kusudo | C09K 3/22 252/88.1 |

OTHER PUBLICATIONS

Polat et al. (Adsorption of PEO/PPO triblock co-polymers and wetting of coal Colloids and Surfaces A: Physicochem. Eng. Aspects 146 (1999) 199-212 (Year: 1999).*

* cited by examiner

*Primary Examiner* — Andrew J. Oyer
(74) *Attorney, Agent, or Firm* — Polsinelli PC

(57) ABSTRACT

Various embodiments for systems and methods for dust suppression in which a mixture of polymer and water is applied to a surface or mixed with particles that prevents the generation of dust after the water evaporates are disclosed.

14 Claims, 21 Drawing Sheets

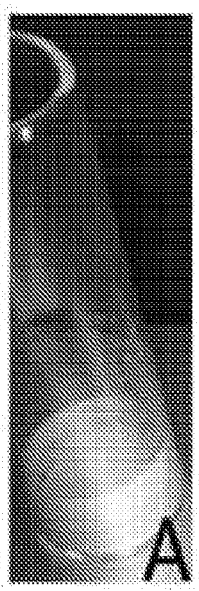 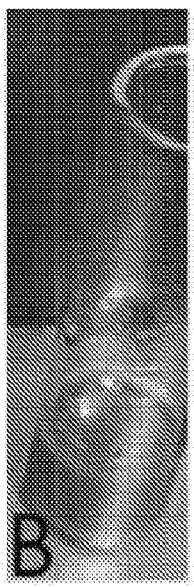 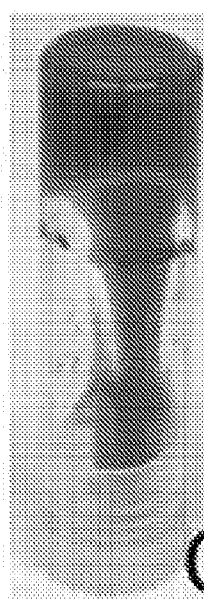 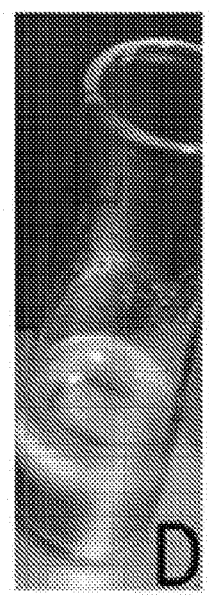 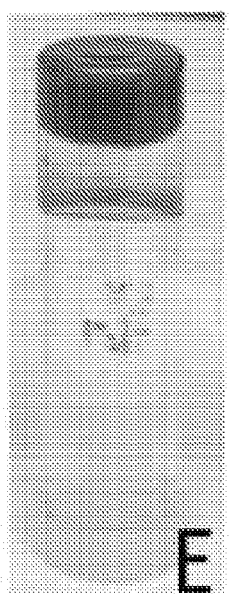
FIG. 5A  FIG. 5B  FIG. 5C  FIG. 5D  FIG. 5E
FIG. 6A  FIG. 6B  FIG. 6C
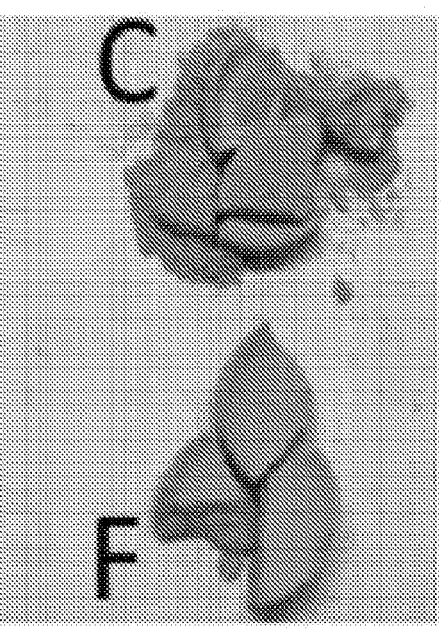
FIG. 6D  FIG. 6E  FIG. 6F FIG. 17A
FIG. 17B
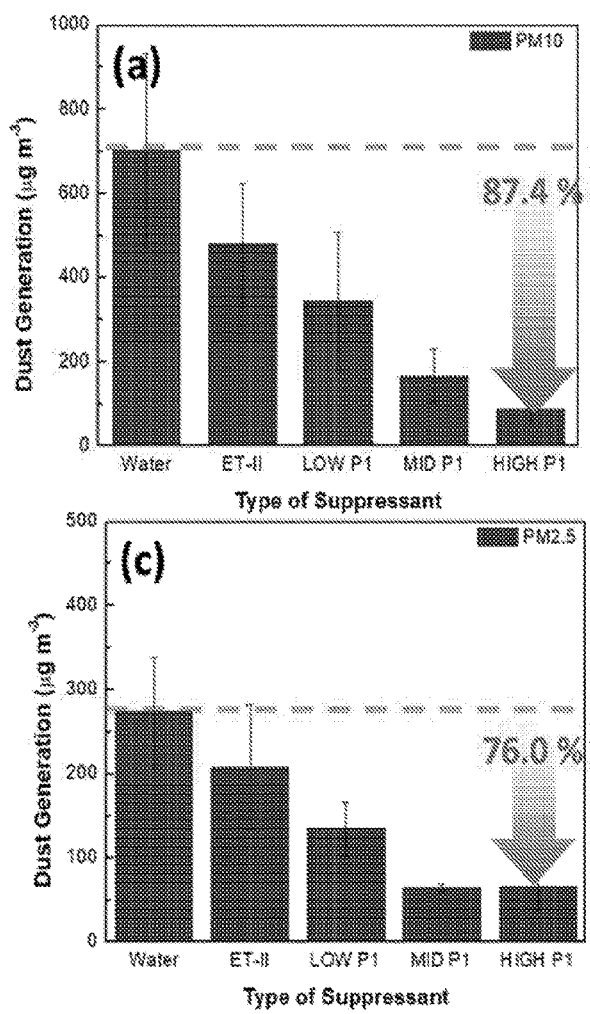
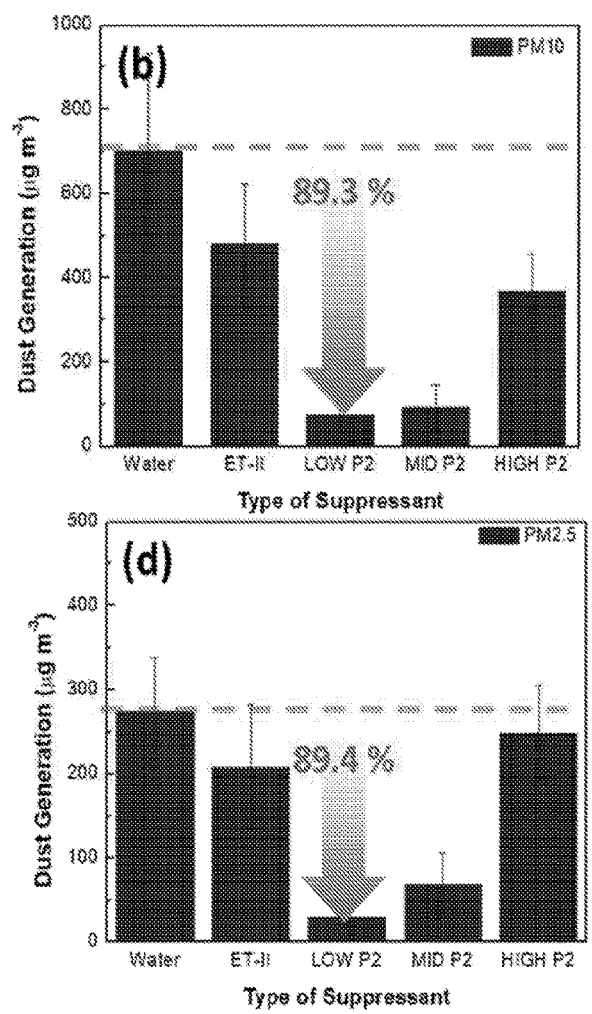
FIG. 17C
FIG. 17D

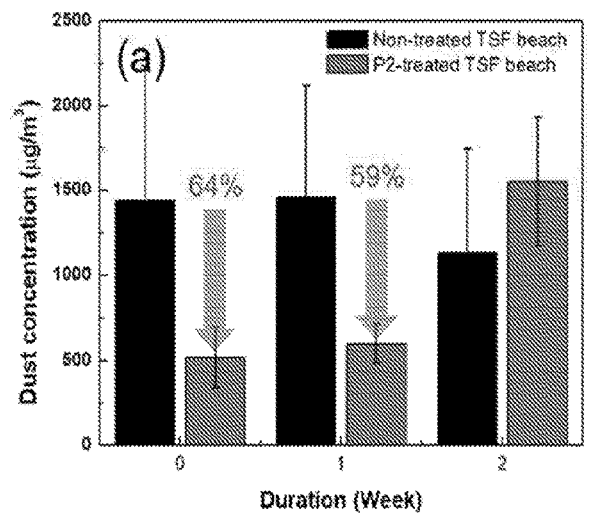
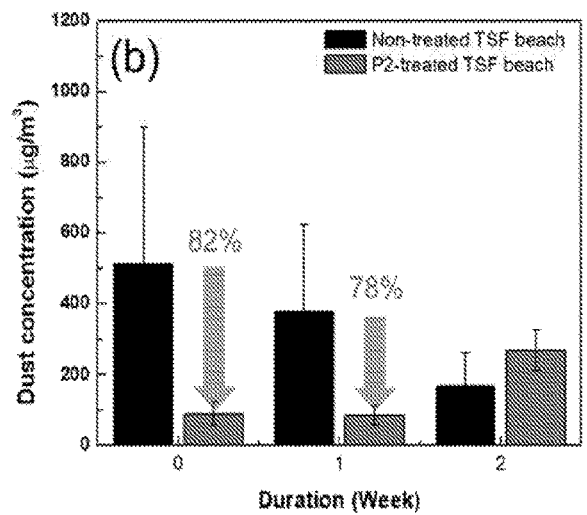
FIG. 22A  FIG. 22B
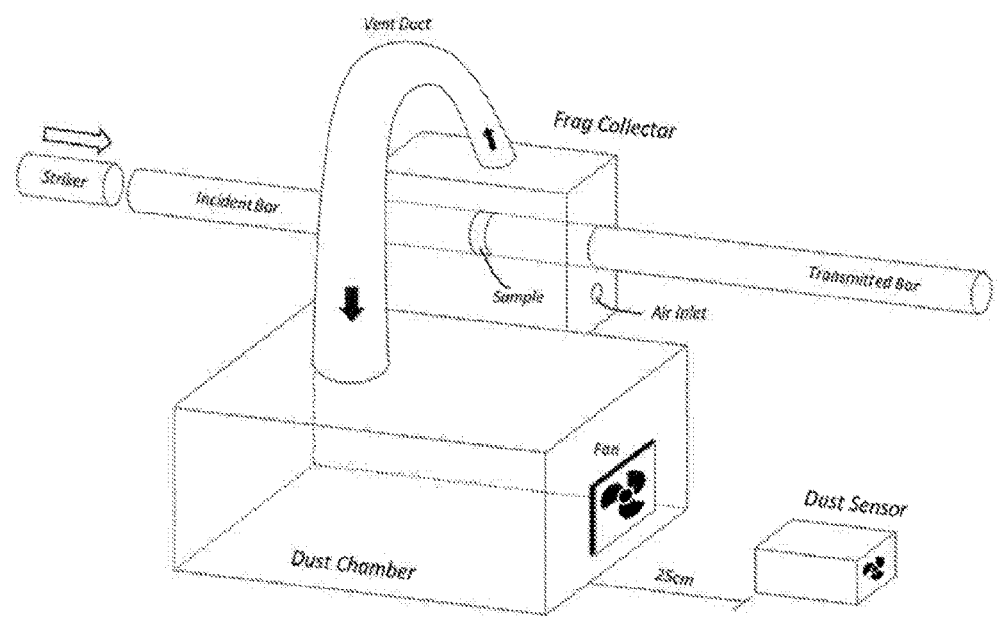
FIG. 23

SYSTEMS AND METHODS FOR DUST CONTROL USING A LIQUID POLYMER

CROSS REFERENCE TO RELATED APPLICATIONS

This application is a U.S. National Stage Application of International Application No. PCT/US2018/055466, filed Oct. 11, 2018, which claims the benefit of the filing date of U.S. Provisional Application No. 62/571,115, filed Oct. 11, 2017, the contents of which are hereby incorporated by reference in their entirety.

FIELD

The present disclosure generally relates to a dust control, and in particular to systems and methods for dust control using a liquid polymer.

BACKGROUND

Tailings—the ore waste of mines—are typically fine and mud-like. Left after the ore is crushed and grinded and the valuable minerals have been extracted, tailings consist of processed heterogeneous rocks. The scale of tailings production is immense, and tailings storage facilities (TSFs) are regarded as the world's largest man-made objects. For example, 100,000 tons of daily throughput (production) generates around 199,500 tons of tailings effluent, including water (0.5% of copper ore grade, 50% pulp density in thickened tailings) in a mid-sized copper mine. One TSF in Alberta, Canada, is 11 miles long and up to 289 feet high. FIG. 1A shows tailings discharge, while FIG. 1B shows a TSF at a copper mine in Arizona.

Mine tailings contain chemicals, usually acids and used to process mineral extraction, and their storage and handling present challenges for long-term containment due to the large scale of footprint. Over the last few decades, the environmental regulations for TSFs have become more stringent in response to growing public concerns.

However, TSFs continue to fail, causing human fatalities and injuries, environmental contamination, and damage to mine infrastructure and local communities. Such failures have occurred almost every year throughout the world. Recent failures include Xiangjjang Wanji Aluminum in China (2016), the Gold King Mine in Colorado (2015), the Yellow Giant Mine in Canada (2015), and the Buenavista del Cobre mine in Mexico (2014), among others. In November 2015, the Germano mine tailings dam, an upstream-type TSF, failed, resulting in the worst environmental disaster in Brazil's history. This failure killed 17 people, destroyed 158 homes, and discharged 62 million cubic meters of iron waste into a nearby river and the Atlantic Ocean. FIG. 1C shows this disaster.

TSF failures have various causes. Rico's (Rico et al., 2008) analysis of TSF failures between 1917 and 2006 provides valuable information. According to this study, the leading causes of TSF failures are unexpected weather conditions (25%), poor management (10%), and seismic liquefaction (20%). In addition:
- 76% of incidents were associated with an upstream-type TSF.
- 83% of accidents occurred in active TSFs.
- 39% of reported incidents occurred in the United States, which ranked #1.

Although this data may be biased since most TSF incidents are unreported in developing countries and countries with limited environmental legislation, the research illustrates the gravity of TSF incidents in the United States.

Upstream TSF Construction and Geometry

The mining industry uses various disposal methods for tailings: underground disposal, water-retention embankments, and raised embankments, which include upstream, downstream, and centerline type TSFs. Upstream TSFs are most common because of their simple construction, low initial development cost, and ability to accommodate a range of materials, including byproducts from the mining and milling processes. They also require a minimal volume of fill material for the perimeter dike and minimal construction time; a starter dike is constructed initially and tailings near the dike are simply excavated and placed on the new crest. Unlike conventional earthen dams, the subsequent raises shown in FIG. 2 are conducted over the life of the TSF.

TSF Management (Tailing Beach Management)

FIG. 3 shows the detailed geometry of an upstream-type TSF, with three different freeboards (e, f, and g). Freeboard (e), the height of the crest, can be measured manually in the field. Freeboard (f) is the vertical distance between the pond water level and the top of the crest; measurement usually requires a specialized monitoring system because of accessibility and scale issues. Freeboard (g), also difficult to measure manually, is defined as the vertical distance between the pond water level and the toe of the crest.

Freeboard (g) Is considered most applicable because it excludes the crest, which has low solidity in an upstream TSF (it comprises mainly tailings and has almost zero cohesion in dry conditions) and, when contacted by pond water, creates the high risks of overtopping, piping and sliding. Unlike freeboards (e) and (f), freeboard (g) can be maximized regardless of the crest height by maintaining the tailings pond (decant pond) in an optimal location and by carefully managing tailings deposition using a strategy that entails monitoring beach distance and angle ("c" and "d" in FIG. 3).

Tailings Beach Management and Dust Control

To ensure TSF stability, it is important to manage tailings deposition strategy (sequential discharge) and achieve the optimum beach distance and angle, maximizing the freeboard (g).

FIG. 4A shows the upstream TSF in a mid-sized Copper mine in Southern Arizona, and FIG. 45 shows the saturated zone near the spigotting area. Because the TSF is only 1,600 feet from a local community (FIG. 4A), maintaining a safe freeboard is critical. Another major concern for the local community is dust generated from the beach's dried zone. Consequently, any management strategy should consider dust control, which is achieved by discharging tailings to saturate the problematic dried zone, in this site. Thus, dust control (tailings beach) could induce serious problems/challenges to keep a smooth beach surface (achieved by the optimized sequential discharge strategy of tailings), reflecting a TSF that is well managed.

Current Technologies for Dust Control in Upstream TSF

In an upstream TSF, dust originates from two main areas: the slope/dike and dried zones on tailings beach surface. Dust generated from the slope/dike can be controlled by conventional methods including implementing a truck-mounted depressant spray system or covering the slope/dike with borrow soils. However, it is challenging to control dust from the dried zones on the tailings beach surface because of accessibility into the beach and scale issues. Currently, the only method for controlling beach dust is to saturate the area by discharging tailings, which contain water, a practice that can lead to TSF Instability, as indicated by an undulating beach surface (Tailings should be discharged sequentially for optimal. TSF management, which creates a smooth beach surface).

Another challenge for dust control is related to the way management responsibilities are delegated in a mine. TSFs are mainly managed by mill operators (the mill department), whereas dust is controlled by the environmental department Miscommunications between two departments could lead to TSF instability.

In addition, dust control inside a mine itself also presents issues since dust is controlled through a use of a spraying system that sprays water during the mining operation, but requires a large amount of water be applied to adequately control the dust generating during operation of a mine.

It is with these observations in mind, among others, that various aspects of the present disclosure were conceived and developed.

BRIEF DESCRIPTION OF THE DRAWINGS

FIGS. 5A-E shows pictures of a benchtop tailings dry test conducted with 25 wt. % amphiphilic polymers.

FIGS. 6A, 6B, 6D, and 6E show pictures of various benchtop tailings dry test conducted with 1 wt. % amphiphilic polymers. FIGS. 6C and 6F show benchtop tailings dry test in the absence of the polymers

FIGS. 17A-17D are graphical representations of reproduced wind tunnel test results for PM10 generation from a liquid hydrophilic polymer formulation, PM10 generation from a liquid amphiphilic polymer formulation; PM2.5 generation from the liquid hydrophilic polymer formulation, and PM2.5 generation from the liquid hydrophilic polymer formulations.

FIGS. 22A and 22B are graphical representations showing dust concentration changes over two weeks for a PM10 concentration and PM2.5 concentration, respectively.

FIG. 23 is an illustration showing a dust collection and measurement system connected with the Split Hopkinson Pressure Bar apparatus.

FIG. 24B is a graphical representation showing the surface tension behaviors with different polymer concentrations and necessary surface tension for coal particle wetting.

Corresponding reference characters indicate corresponding elements among the view of the drawings. The headings used in the figures do not limit the scope of the claims.

DETAILED DESCRIPTION

Figure 1B:
FIGS. 1A-1C are pictures showing a tailings discharge, an upstream TSF, and a TSF failure disaster, respectively, at the Germano mine, Brazil.
Figure 1A:
Figure 1C:
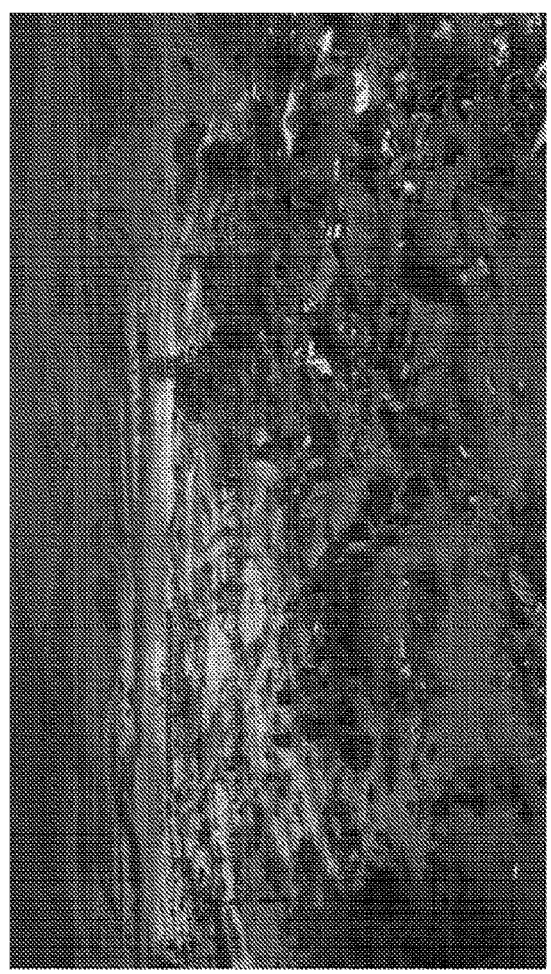
Figure 2:
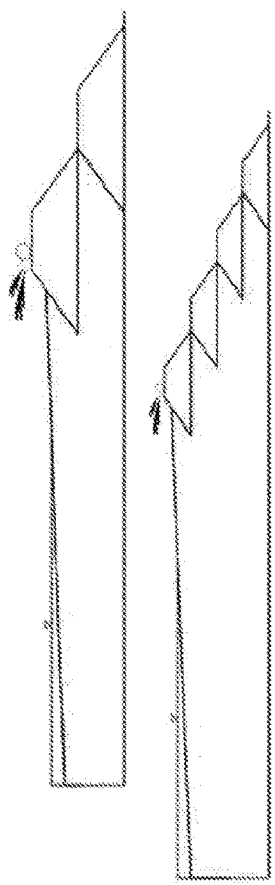
FIG. 2 are illustrations showing an upstream TSF sequential raising.
Figure 2:
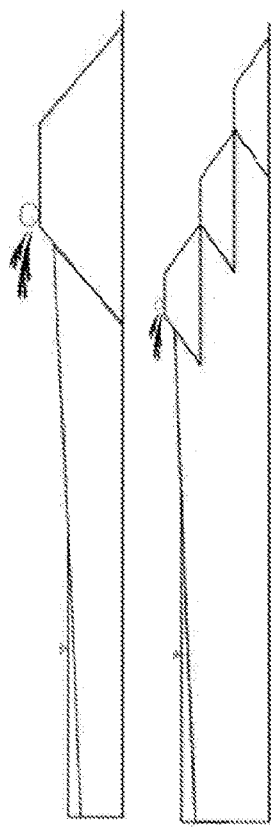
Figure 3:
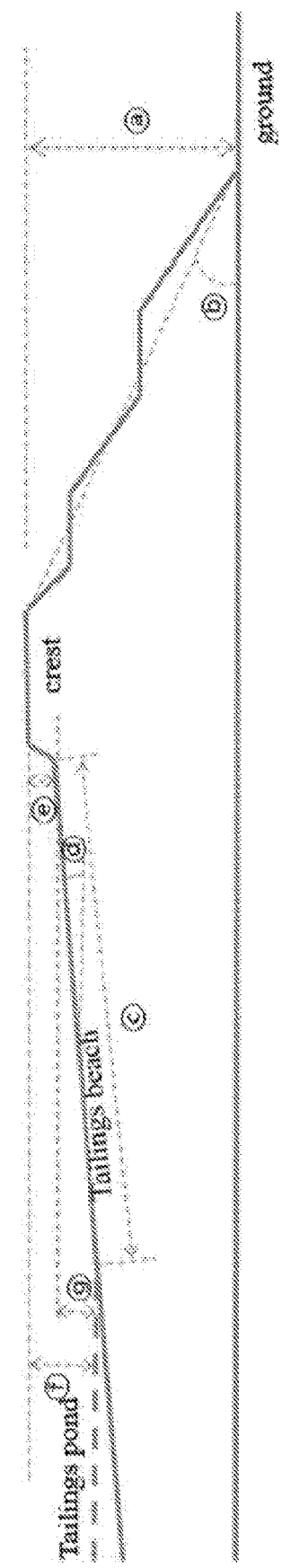
FIG. 3 is an illustration showing upstream geometry of an upstream TSF.
Figures 4A, 4B:
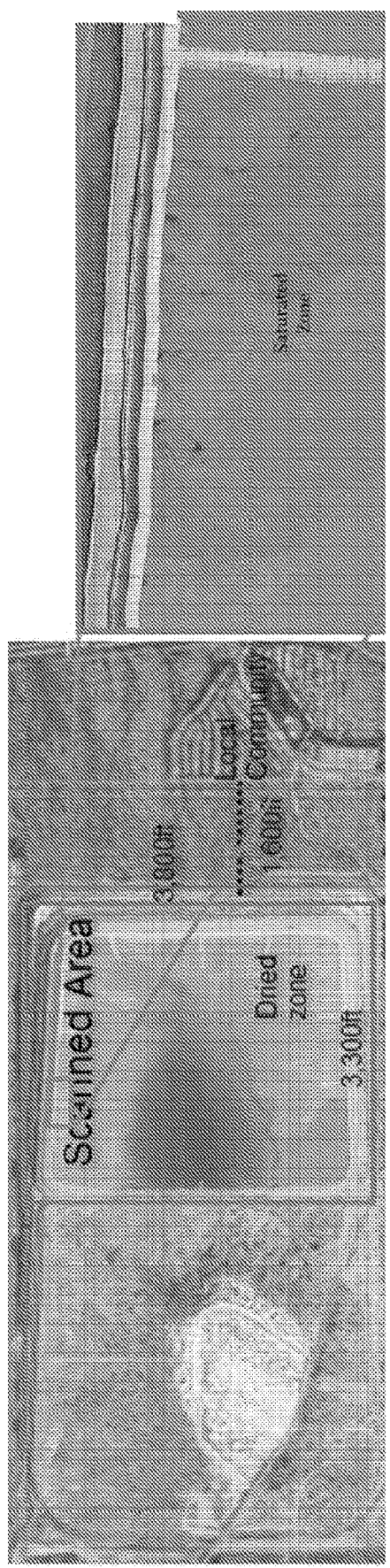
FIGS. 4A and 4B are pictures of a test site at an upstream TSF.

Various embodiments related to systems and methods for dust control using environmentally friendly polymer formulations being applied to an area for controlling dust are disclosed. In some embodiments, systems and methods for control dust related to mine tailings using a biocompatible liquid polymer being intermixed, applied, or combined with the mine tailings such that dust is prevented from being generated are disclosed. In some embodiments, systems and methods for controlling dust at a tailings storage facility (TSF) are also disclosed. In some embodiments, a liquid polymer comprising a liquid amphiphilic polymer may be combined with mine tailings or dust to enhance the wettability of mine tailings or dust to promote dust control are disclosed. In some embodiments, a liquid polymer comprising a liquid hydrophilic polymer may be combined with mine tailings or dust to establish a degree of particle bonding with the mine tailings and dust as well as enhance the wettability of the mine tailings or dust to promote dust control are disclosed. In some embodiments, methods for dust control in a mine by combining a concentration of a liquid polymer with a water sprayed within the mine to suppress dust are disclosed. In some embodiments, the liquid polymer may be applied using a spraying action, an intermixing action or a combining action with mine tailings or dust to provide dust control.

Use of the Current Tailings Transportation and Spigotting System to Spray the Depressant.

In some embodiments, to control the beach dust made of mine tailings, various biocompatible polymer formulations may be mixed with the mine tailings being stored at a TSF: (1) before the mine tailings are pumped out from the thickener (dewatering system) to the TSF; (2) when the mine tailings are discharged through the spigot by spraying a biocompatible polymer formulation near the spigot on the crest; or (3) after the mine tailings have already been pumped into the TSF by using a spraying apparatus to spray the biocompatible polymer formulation over the TSF either manually or mounted on a vehicle. In addition to controlling dust, introduction of the biocompatible polymer with the mine tailings may reduce the abrasiveness of the mine tailings on the high-density polyethylene (HDPE) pipe, which forms a part of a conventional transportation system that transports the mine tailings to the TSF. This effect has several advantages. First, introducing a biocompatible polymer to the mine tailings may reduce the maintenance cost for the tailings transportation system from the mill to the TSF. Second, introducing the biocompatible polymer to the mine tailings may decrease the water volume required in the mine tailings, thereby saving water supplies. Since water content is key to optimizing the flow velocity of mine tailings in the transport pipe, mixing the biocompatible polymer before pumping the mine tailings out (near the mill operation) may prove even more beneficial.

Use of a Novel Spraying Technology.

The optimal percentage of biocompatible polymer to add to the tailings is disclosed herein along with a method of applying or spraying the biocompatible polymer into the tailings as the tailings exit the spigot or by a using either a manual spraying application Or a vehicle that sprays the biocompatible polymer over the mine tailing residing in the TSF. Investigations have been conducted to optimize the duration and timing of spraying while maintaining the polymer's efficacy in controlling dust along the tailings beach of the TSF or dust generating within a mine during operations.

Preliminary Study

To circumvent the challenges to controlling dust in a tailings beach, a mine, or other source of dust, biocompatible polymer formulations were developed that were found to enhance the wettability of accumulated mine tailings along the tailing beach of the TSF or dust generation within a mine or other source which was found to significantly reduce the dried zone of the mine tailings beach despite the fact that the water in the tailings beach evaporated. To transfer the technology immediately to the mining industry while considering human health, commercially available, biocompatible, non-ionic liquid polymers were selected to develop a formulation for application to mine tailings being stored in a TSF or dust generated in a mine or other source. In tests that were conducted, the non-ionic property of polymers was found to decrease the interactions between remaining concentrations of the polymer in recycled water and metal ores, which was previously expected to have no effect-on current mining processes. It was found that when the water dried up in the tailings beach of a TSF, the liquid polymers provided sufficient moisture or particle bonding to the mine tailings to prevent dust generation. In addition, the liquid state of the polymers at environmental temperatures was also found to allow these polymers to easily mix, with the mine tailings or adhere to dust.

Among commercially available, biocompatible, non-ionic, liquid polymers, amphiphilic block copolymers were chosen for mixing with mine tailings. Amphiphilic polymers are generally used as surfactants (i.e. soap) because these polymers exhibit properties that lower the surface tension between a liquid and a solid and emulsify them well. The test used Pluronic, an amphiphilic polymer, also referred to commercially as poloxamer, composed of hydrophilic polyethylene oxide (PEO) block and hydrophobic polypropylene oxide (PPO) block in a single polymer chain (e.g. PEO-PPO polymer, and PEO-PPO-PEO polymer). Tablet shows selected Pluronic polymers in a preliminary study disclosed herein. The preliminary study showed a few sets of Pluronic polymers bound to hydrophobic regions of small biomolecules by simply mixing. Based on this information, it is possible that the hydrophobic block of the polymer can bind to hydrophobic regions of tailings particles and emulsify mine tailings and water for providing a better transportation process in the HDPE pipe before the discharge. In addition, Pluronic binding to tailings may provide the opportunity to avoid complete tailings drying after water evaporation on the beach because of the liquid property of the attached polymer, reducing the beach dust.

TABLE I

| Polymer | Commercial Name | Molar Mass of PEO-PPO-PEO block copolymer (g/mol) | PEO (%) | Hydrophilic PEO Molar Mass (g/mol) | Hydrophobic PPO Molar Mass (g/mol) |
| --- | --- | --- | --- | --- | --- |
| A1 | Poloxamer or Pluronic L62 | 1800 | 20 | 360 | 1440 |
| A2 | Poloxamer or Pluronic L92 | 2700 | 20 | 540 | 2160 |

During the preliminary study, liquid amphiphilic polymers with various concentrations were mixed with mine tailings that were found to modify the physical properties of the mine tailings after water evaporation. A benchtop tailings dry test was performed by exposing 1 mL of mine tailings in the presence or absence of polymers in open 2 mL glass vials at 25° C. In this experimental setup, the water in mine tailings completely dried up within a week (FIG. 5A). However, when 25 wt. % liquid amphiphilic polymer with two different molar masses (polymer A 1: 1800 g/mol; polymer A2: 2700 g/mol) were added to the mine tailings, both polymers initially emulsified together with tailings. After two weeks, the mine tailings with polymer A1 still in a liquid state (FIGS. 5B and 6C), while the test tube including polymer A2 shows phase separation with hydrogels on top of the mine tailings (FIGS. 5D and 5E). When polymer concentrations were reduced down to 5 wt. %, the polymers were well emulsified with mine tailings and the wetted mine tailings were observed over several months. In 1 wt. % polymer concentrations, the stacked tailings particles mostly lost the moisture by visual inspection (FIG. 6). The mine tailings stack with polymer A1 did not show any major cracks and held all particles together (FIGS. 6A and 6D), indicating that the polymer A1 can strongly adhere to the particles of the mine tailings. The mine tailings stack with polymer A2 displayed a little crack (FIGS. 6B and 6E). On the other hand, the mine tailings stack in the absence of polymers showed several cracks in the mine tailings particles, which generated dust at the tailings beach (FIGS. 6C and 6F). All tested samples maintained similar physical properties for more than three months. This concludes that the addition of amphiphilic liquid polymer in mine tailings can enhance the wettability or physical interactions between particles in spite of complete water evaporation, thereby indicating that this method controls the dust in the mine tailings beach by providing a smooth beach surface since sequential discharge strategy of mine tailings in a TSF can be applied and enhance the stability of the mine tailings beach by increased interaction between particles mediated by the liquid polymers Based on current results, the polymer A1 can be still effective with 1 wt. % in tailings effluent and it is possible that the concentration of the polymer can be even decreased. However, if 1 wt. % is the minimum polymer concentration, in a mid-sized copper mine, approximately 2,000 tons of polymer A1 is required per a single day. To reduce polymer amounts with the same positive effect, the time point of polymer addition into tailings before the discharge can be controlled. Instead of emulsifying polymers with entire tailings, liquid polymers can be added to tailings right before closing peripheral tailings discharge and starting the next peripheral discharge during the sequential process. This will allow accumulation of tailings/polymer mixture on the surface and the similar effect of wettability or particle bonding can be expected that can still prevent the dust from tailings beach surface. This approach will significantly decrease polymer amounts and achieve economic dust control of tailings beach.

In some embodiments, the present system for dust suppression may also be applied to control dust along roadways by spraying a mixture of water and polymer along the roadway to suppress or eliminate dust. In some embodiments, the present system for dust suppression may be applied to control dust in fly ash from coal or dust from a coal pile by spraying the mixture of water and polymer over the fly ash or coal pile: In some embodiments, the present system for dust suppression may be applied by spraying a surface or blending a mixture of water and polymer. In general, the liquid polymer may be applied to a surface area (e.g., road surface, coal mine surface, pot ash surface) to suppress dust or mixed with water and sprayed onto the dust or surface area or, in the alternative, added directly to mine tailings, aggregate, or slurry to suppress dust.

In some embodiments, the liquid polymer may be biocompatible, non-ionic, and/or amphiphilic depending on the application.

The present system for dust suppression is currently contemplating two polymers—liquid state; Pluronic L62, Pluronic L92, PEG200, PEG600.

In some embodiments, the concentration range of liquid polymer may be 5% or less.

The following is a list of polymers that may be used in the present system for dust suppression.

Pluronic®: Poloxamers are non-ionic triblock copolymers composed of a central hydrophobic chain of polyoxypropylene (poly(propylene oxide)) flanked by two hydrophilic chains of polyoxyethylene (poly(ethylene oxide)). The word "poloxamer" was coined by the inventor, Irving Schmolka, who received the patent for these materials in 1973. Poloxamers are also known by the trade names Synperonics, Pluronics, and Kolliphor.

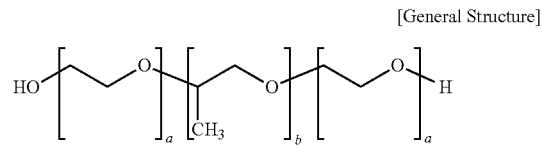

[General Structure]

| a. Types and Technical Information | | | | |
|---|---|---|---|---|
| — | Phase | M/W (g/mol) | M.P. (° C.) | Solubility in water |
| 25R4 | Liquid | 3600 | 25 | >10% |
| 31R1 | Liquid | 3250 | −25 | >1% |
| L10 | Liquid | 3200 | −5 | >10% |
| L31 | Liquid | 1100 | −32 | O |
| L35 | Liquid | 1900 | 7 | >10% |
| L44 | Liquid | 2200 | 16 | >10% |
| L62 LF | Liquid | 2450 | −10 | >10% |
| L92 | Liquid | 3650 | 7 | >1% |

O: Completely soluble in water

Polyethylene glycol (PEG): Polyethylene glycol (PEG), also known as polyethylene oxide (PEO) or polyoxyethylene (POE) is a polyether compound with many applications from industrial manufacturing to medicine. The three names are chemically synonymous and depending on its molecular weight, PEG, PEO, and POE refer to an oligomer or polymer of ethylene oxide. PEG is preferred in the biomedical field and has tended to refer to oligomers and polymers with a molecular mass below 20,000 g/mol. PEGs are commercially available over a wide range of molecular weights from 300 g/mol to 10,000,000 g/mol.

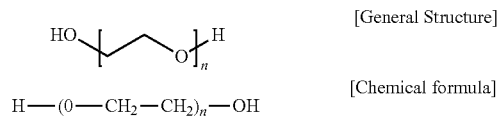

[General Structure]

[Chemical formula]

$H-(O-CH_2-CH_2)_n-OH$

| b. Types and Technical Information | | | | |
|---|---|---|---|---|
| — | Phase | M/W (g/mol) | M.P. (° C.) | Solubility in water |
| 200 | Liquid | 190-210 | −65 | O |
| 300 | Liquid | 285-315 | −15--8 | O |
| 400 | Liquid | 380-420 | 4-8 | O |
| 600 | Liquid | 570-630 | 17-22 | O |

O: Completely soluble in water

Triton™: TRITON™ product line feature nonionic/anionic surfactants. For example, Triton X-100 ($C_{14}H_{22}O(C_2H_4O)_n$) is a nonionic surfactant that has a hydrophilic polyethylene oxide chain (on average it has 9.5 ethylene oxide units) and an aromatic hydrocarbon lipophilic or hydrophobic group. The hydrocarbon group is a 4-(1,1,3,3-tetramethylbutyl)-phenyl group.

[General Structure]

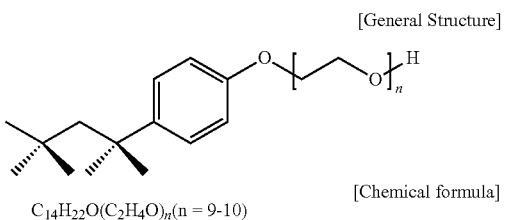

$C_{14}H_{22}O(C_2H_4O)_n$ (n = 9-10)  [Chemical formula]

c. Types and Technical Information

| — | Phase | M.P. (° C.) | Solubility in water[a] |
|---|---|---|---|
| BG-10 | Liquid | −5 | O |
| CF-10 | Liquid | 15 | O |
| CF-21 | Liquid | −27 | O |
| DF-12 | Liquid | 16 | O |
| DF-16 | Liquid | −6 | O |
| X-100 | Liquid | 1 | O |
| X-102 | Liquid | 13 | O |
| X-114 | Liquid | −14 | O |
| X-207 | Liquid | −14 | O |

O: Completely soluble in water

The Lutensol® X L grades are manufactured by alkoxylating a single-branch C10 alcohol. The polymer performs as emulsifies and has an excellent wetting action:

$RO(CH_2CH_2O)xH; R=C_n>H_2I;$
$X=4, 5, 6, 7, 8, 9, 10, 14$  [Chemical formula]

d. Types and Technical Information

| — | Phase | M/W (g/mol) | M.P. (° C.) | Solubility in water[a] |
|---|---|---|---|---|
| XL-79 | Liquid | 560 | 0 | O |
| XL-89 | Liquid | 860 | 3 | O |

O: Completely soluble in water

Polypropylene glycol (PPG) also known as Polypropylene oxide (PPO), Polyoxypropylene, 2-(2-hydroxypropoxy) propan-1-ol, Emkapyl, Lineartop E. Niax ppg is a polyether compound with many applications from Industrial manufacturing to food and medicine. PPG is clear, viscous liquids with low pour points. When molar mass is increasing, its solubility in water decreases while viscosity increases. Typically, PPG with molar mass below 2,000 g/mol is soluble in water and can be used as a part of dust suppressants

[General Structure]

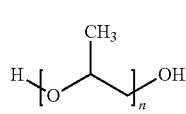

$H—[OCH(CH_3)CH_2]_n—OH$  [Chemical formula]

e. Types and Technical Information

| PPG (DOW) | Phase | M/W (g/mol) | M.P. (° C.) | Solubility in water |
|---|---|---|---|---|
| P400 | Liquid | 446 | <−150 | O |
| P425 | Liquid | 425 | <−150 | O |
| P725 | Liquid | 725 | <−150 | O |
| P1000 | Liquid | 1000 | <−150 | O |
| P1200 | Liquid | 1200 | <−150 | O |
| P2000 | Liquid | 2000 | −30 | insoluble |

O: Completely soluble in water

Experimental Results

Task 1: Project Setup for Field Trials

The project team determined the study area for conducting experiments and met with environmental engineers (ASARCO Mission Mine/ASARCO Ray Mine/FMI Sierrita Mine) to prepare a detailed configuration of the proposed field trials as well as discuss tailings sampling for laboratory tests, testing sites, and safety training to access the mine.

Task 2: Investigate the Various Commercially Available Biocompatible Polymers.

Specific Objective: To Determine the Best Candidates of Biocompatible Polymers for the Next Tasks.

Initially, four polymers (P1-P4) were investigated. For convenience, the polymers are abbreviated as follows:

P1: Polyethylene Glycol 200 (PEG200),
P2: Poloxamer 182 (Pluronic® L62),
P3: Polyethylene Glycol 600 (PEG600), and
P4: Poloxamer 282 (Plumb® L92).

The commercially available polymers were searched and selected according to the following requirements; (1) the polymers had to be in a physically liquid phase in the ambient conditions; (2) the freezing point of those polymers had to be at least below −10° C. so they would not freeze; and (3) the polymers had to be highly soluble in water and of an environmentally friendly nature. Based on the materials safety data sheet (MSDS), the physical and chemical properties of the polymer candidates are briefly summarized in Table 2. The P1 and P3 are completely dissolved in water, whereas the P2 and P4 are less soluble by upto 10% and 1%, respectively. Regarding the freezing point criteria, the P1 and P2 present well-matched values. According to the hazards identification, the P1 and P3 are satisfied with the regulations enacted by the United States Food and Drug Administration (FDA) and the Environmental Protection Agency (EPA); According to the 2012 OSHA Hazard Communication Standard (29 CFR 1910.1200), P2 and P4 polymers are not considered hazardous.

TABLE 2

Physical and chemical properties of the biocompatible polymers based on the materials safety data sheet

| Type | Form | Solubility in water | Freezing point | Flash point | Toxicity |
|---|---|---|---|---|---|
| P1 | liquid | Completely | −55° C. | 190° C. | 30.2 g/kg |
| P2 | liquid | <10% | −10° C. | 215° C. | 5 g/kg |
| P3 | liquid | Completely | 17-22° C. | 274° C. | 30 g/kg |
| P4 | liquid | <1% | 7° C. | 230° C. | 2 g/kg |

Figure 7:
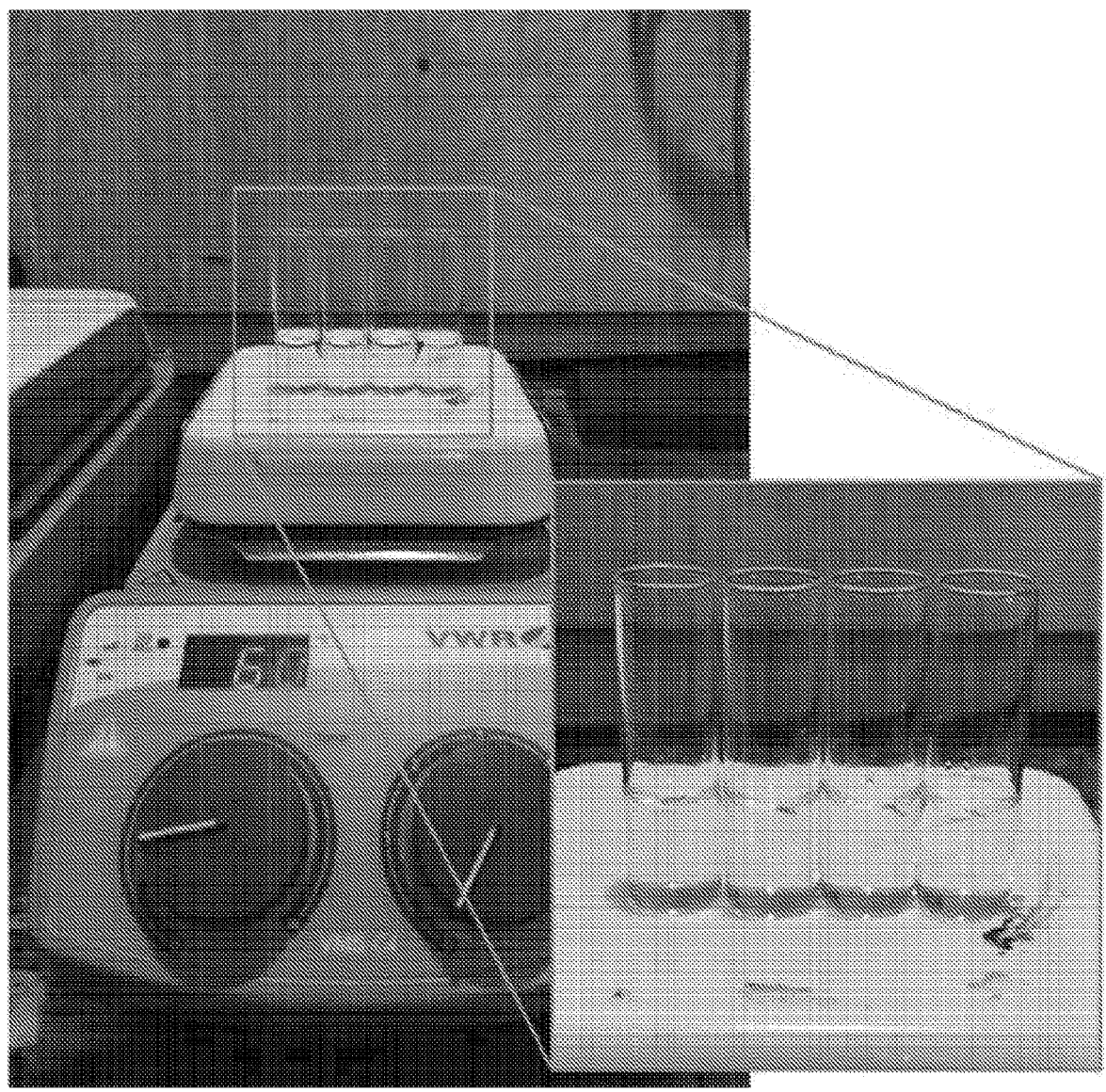
FIG. 7 is an image demonstrating the long term thermal stability of all four selected polymers at a high environmental temperature.

The selected polymers are non-volatile materials at room temperature (typically measured at 20° C.). The long-term stability of the polymers was investigated under the harsh condition (on the hot plate at 60° C.), as shown in FIG. 7. The polymers with 2 mg were, weekly weighed to investigate the weight change over time. Over a two-month investigative period, the weight loss was in the range of ±2% for P1, P2, and P3 polymers and the weight of P4 polymer decreased drastically in four weeks but did not exceed ±10%. The small change in weight shows that the liquid state of polymers is very stable at high environmental temperature.

Figure 8:
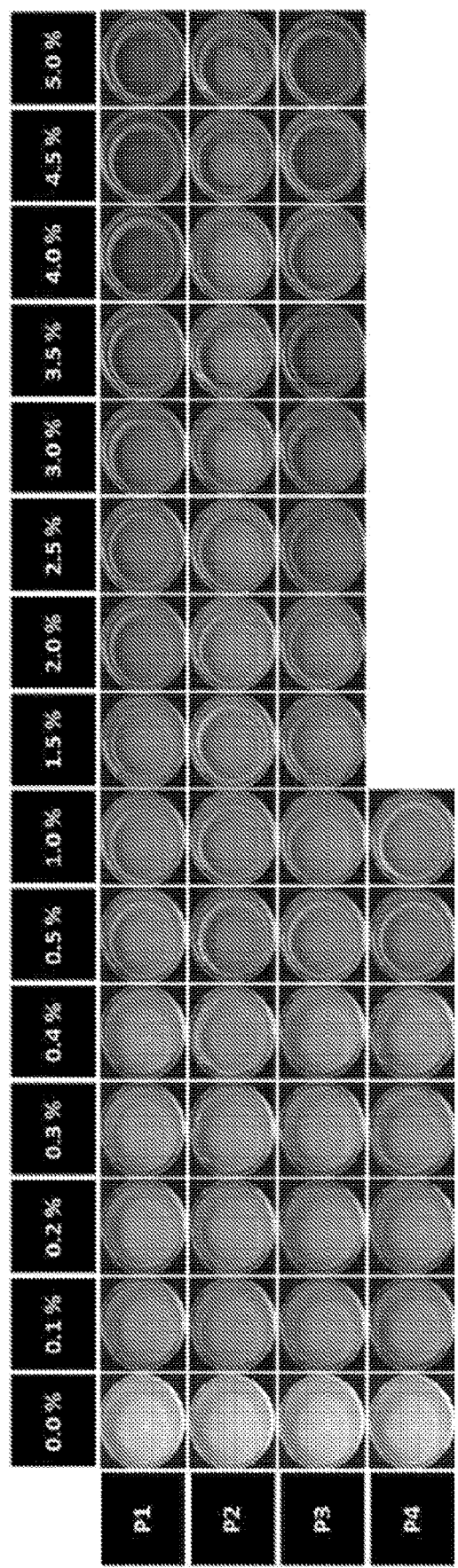
FIG. 8 shows images of the wettability of tailings particles with various concentrations of the polymers.

The wettability test on the biocompatible polymers was carried out to achieve an effective amount of the polymers. The concentrations of the polymers were systemically designed from 0 to 5 vol. %. The 500 µL of fresh tailings obtained from the testing site were first put into a vial, and a certain amount of water was removed from the vial. Next, the same amount of the polymers was added into the vial, and then the mixture of fresh tailings and polymer was placed on the hot plate at 60° C. FIG. 8 shows the images of the dried mixture after two weeks. Although there were no considerable differences between the types of polymers, images clearly showed that the polymers effectively enhanced the wettability of the dried tailings particles (FIG. 8). In the grayscale analysis of the images, the wettability increased more than approximately twofold with the addition of 0.1% to 1.5% polymer concentration than the non-treated sample (0%), and more than threefold increase when the concentration increased 2 to 5%. In addition, the grayscale analysis showed that the color scale initially measured maintained more than two months, indirectly concluding that the addition of polymers effectively enhances not only the wettability but also the long-term stability (FIG. 8)

Economic Aspect
Task 3: Investigate the Optimal Percentage of Polymer that can Control Tailings Dust.

Specific objective: To find the effectiveness of biocompatible polymers as a dust suppressant by conducting a wind erosion test in both laboratory-scale and pilot field-scale (small-scale).

Study Area

Figure 9:
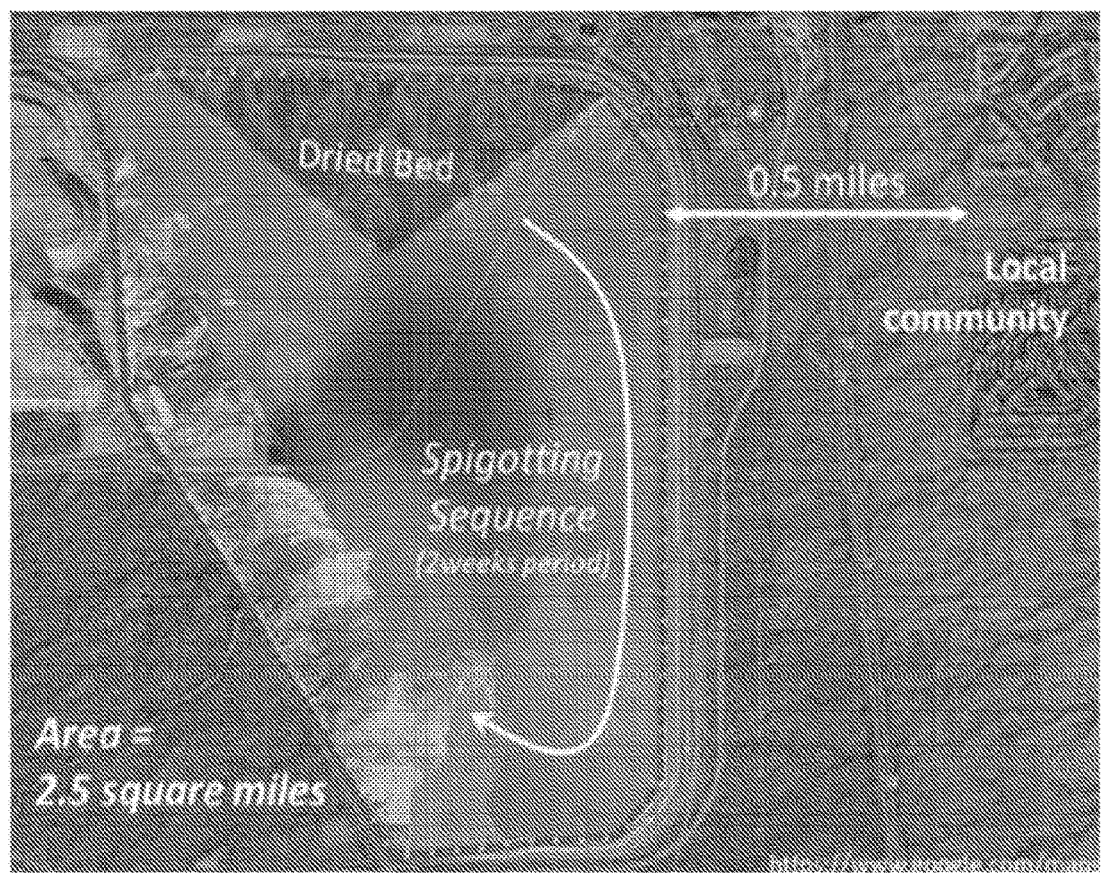
FIG. 9 is an image showing the top view of typical TSF and the dried zone in active TSF.

The study area is shown in FIG. 9. The tailings slurry was discharged periodically on the active TSF. Before the next discharge round of tailings, the surface of the tailings beach becomes dry and reportedly generates the dust from that dried area. The local community is only 0.5 to 2.0 miles away from the TSF.

TSF Beach Dust Control

Figure 10A:
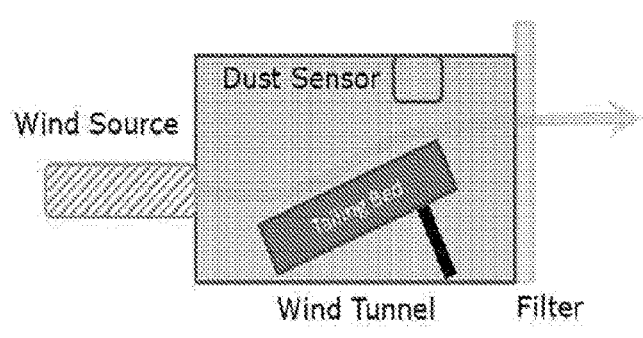
FIGS. 10A and 10B show images of a wind tunnel system.

An active (operating) TSF beach can generate a significant amount of fugitive dust. A measure of fugitive dust follows EPAs recommendation for particulate matter (PM) 10 and 2.5. PM10 and PM2.5 refer to a particle size smaller than 10 µm and 2.5 µm, respectively. The dust from the active TSF beach generates from two sources: the surface of dried TSF beach surface; and the desiccation crack. This task consisted of two mainstreams to quantify the dust generation from each source. The laboratory wind tunnel tests shown in FIGS. 10A and 10B were conducted to investigate dust generation from the beach surface. The small-scale field tests shown in FIG. 12A-12C were conducted to investigate the combined action (generation) of the beach surface and desiccation cracks.

Laboratory-Scale Tests

Figure 10B:
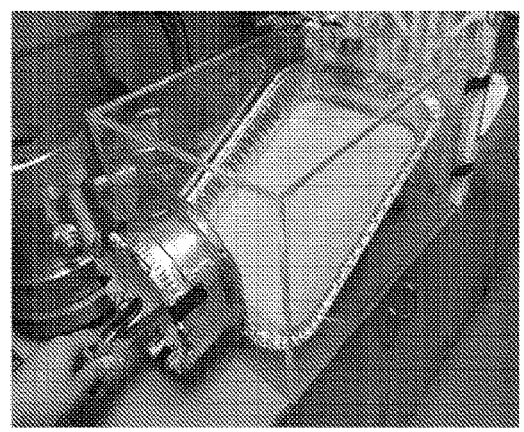

The customized wind tunnel simulated the windy days in the testing site, where the monthly maximum wind speed is recorded as 22-25 mph according to NASA MERRA-2 weather database. The customized wind tunnel system is shown in FIGS. 16A and 10B. The PM10 and PM 2.5 dust generation were detected by the dust sensor, SDS-021, which uses a laser diffraction particle sizing technology. The tailings samples were prepared in lab-scale to mimic the tailings beach in an active TSF. The wind was aimed at the surface of the tailings beach sample on an aluminum tray. The tailings powder samples were mixed with water and the mixture dried for one week at 100° F. (~40° C.) to make a tailings bed. The fresh tailings were spread on top of the tailings bed first, and the fresh tailings with various polymer formulations were additionally applied to it. One to two weeks later, dust generation was investigated using the wind tunnel.

The wind tunnel tests showed the relationship between the polymer concentrations and PM10 dust generation. The laboratory test results show a dust generation of 200-500 µg/m³ from the tailings beach surface after water dried, which is classified as worse than the 'unhealthy' level (250 µg/m³) of the Air Quality Index (AQI) established by EPA.

Small-Scale Field Tests

Figures 11A, 11B, 11C:
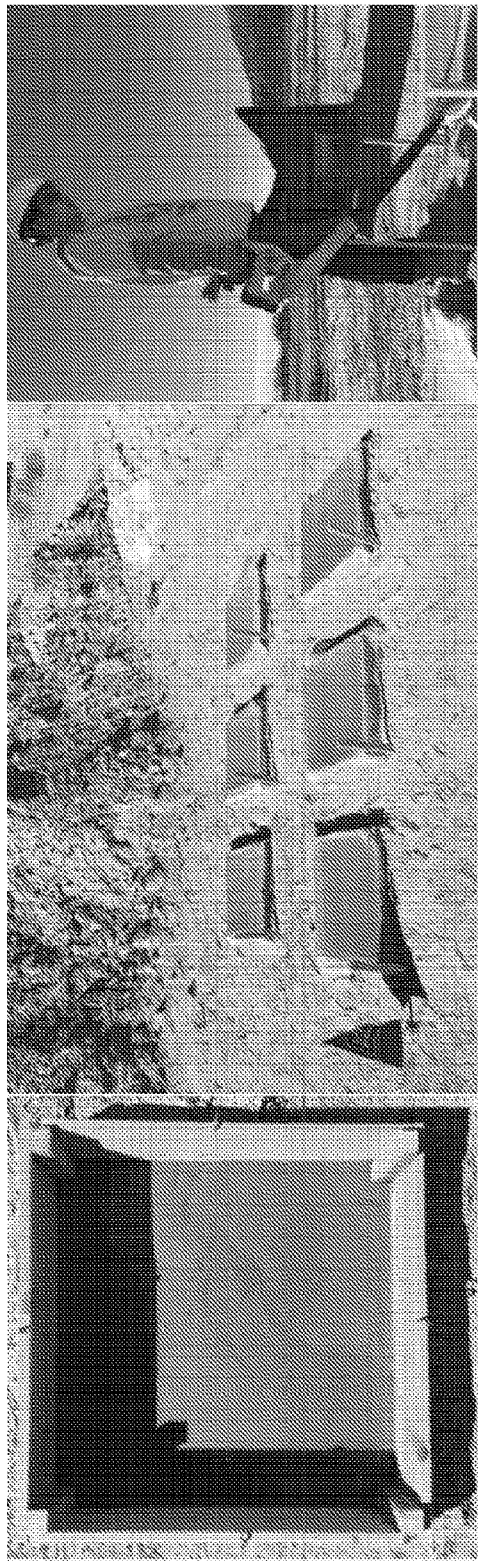
FIGS. 11A-11C show images of small-scale tests.

The small-scale field tests were implemented at #5 TSF in Mission Mine. #5 TSF is an auxiliary area used for emergency purposes. Several small-scale raised gardens were installed to make a tailings beach and to conduct the erosion tests. Topsoil was removed for the pure dried tailings bed, and fresh tailings were discharged (FIG. 11A). These were dried for one week (FIG. 11B). By using a portable blower, dust concentrations in local air were measured (FIG. 11C).

Figure 12A:
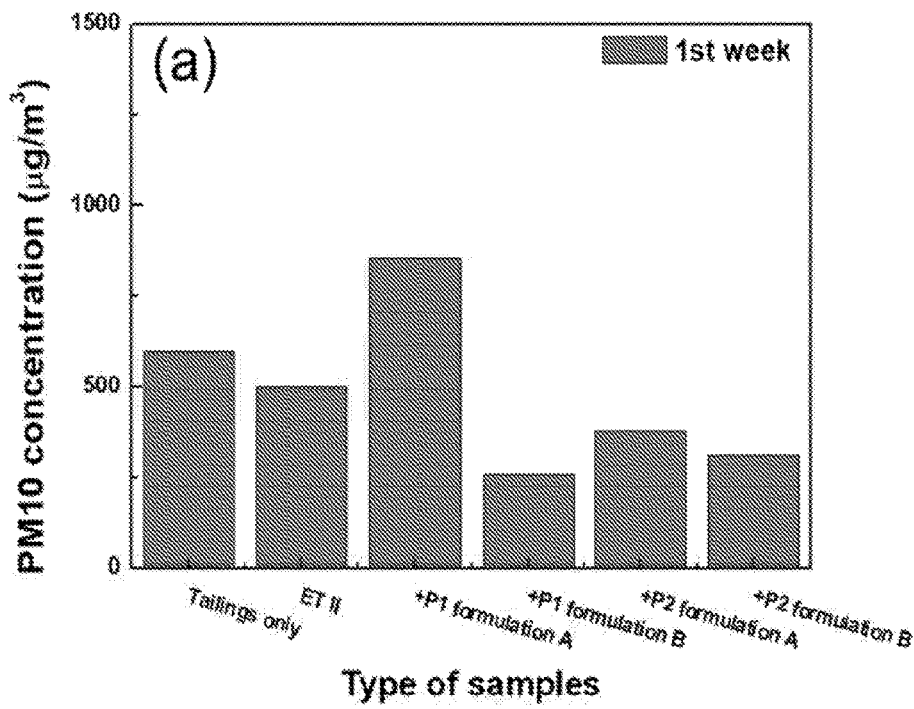
FIGS. 12A and 12B are graphical representations showing PM10 dust generation from small-scale field tests after one week and two weeks, respectively.
Figure 12B:
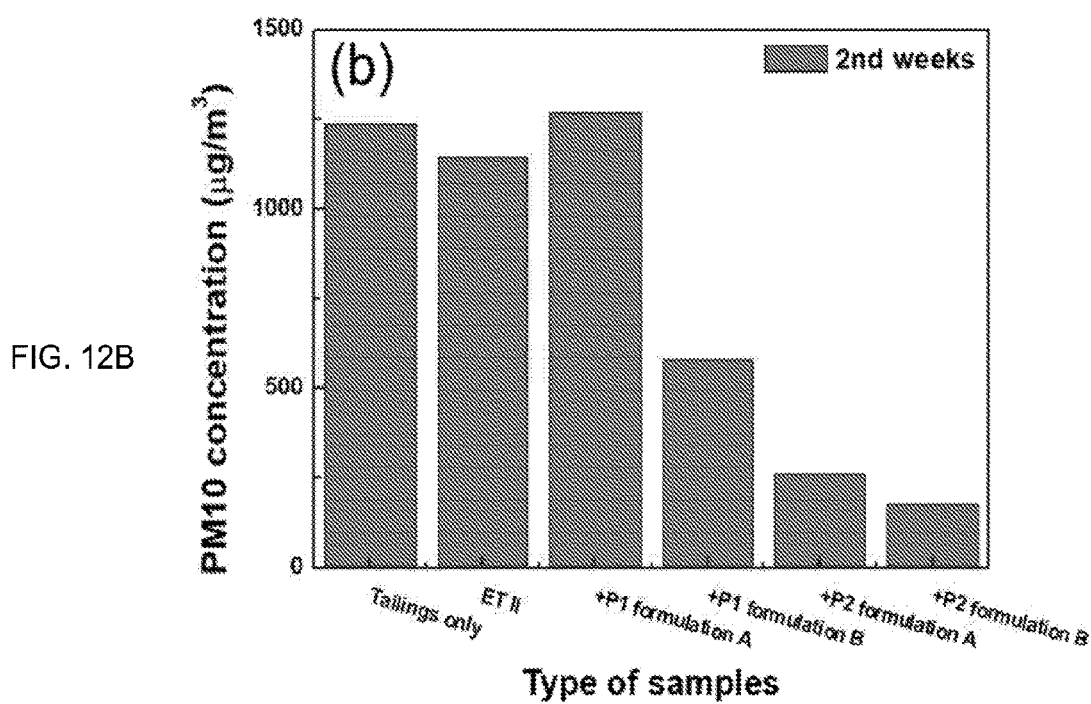
Figure 14A:
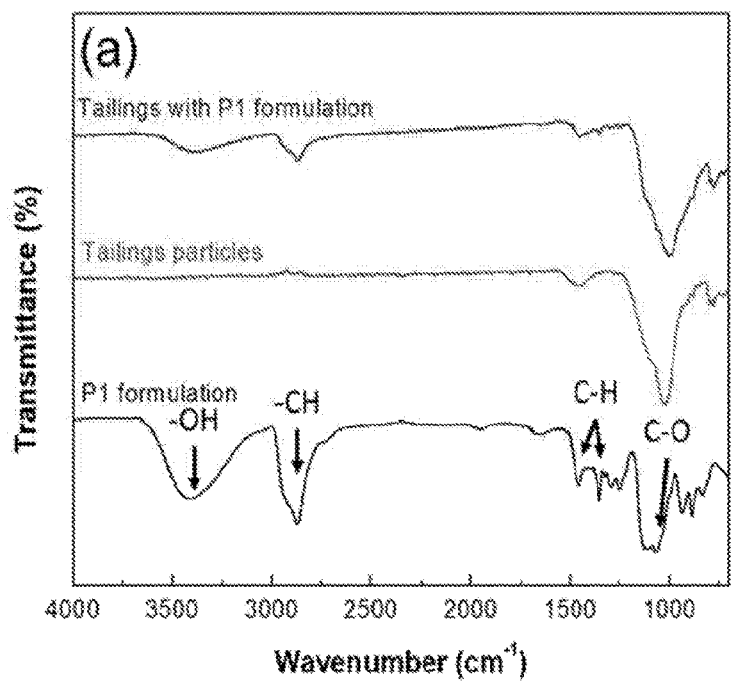
FIGS. 14A and 14B show graphical representations of a comparison between tailings combined with a hydrophilic polymer and a amphiphilic polymer, respectively, by using the ATR-FTIR methods.
Figure 14B:
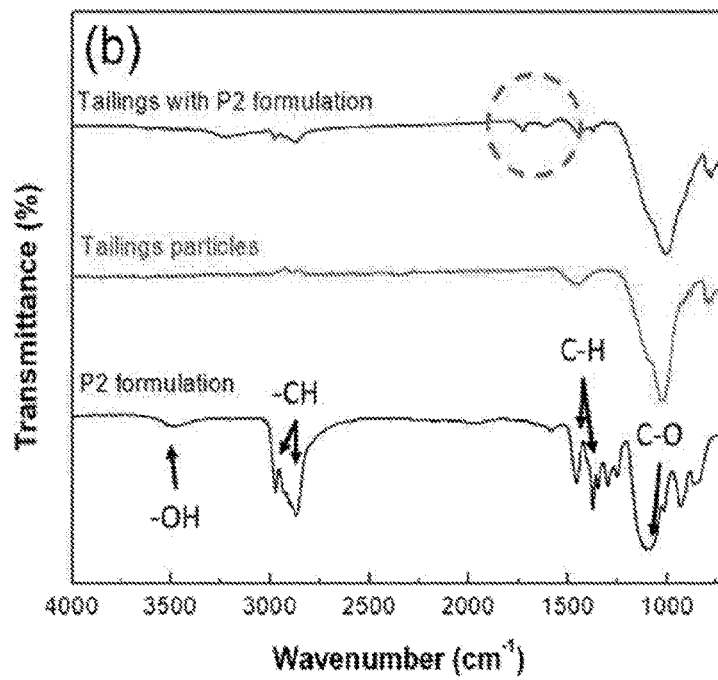
Figure 15A:
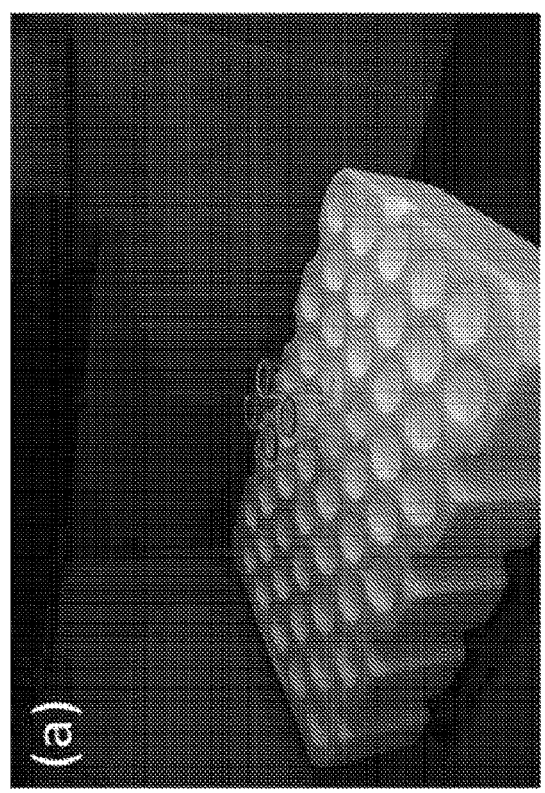
FIG. 15A is an image of UV testing samples.
Figure 15C:
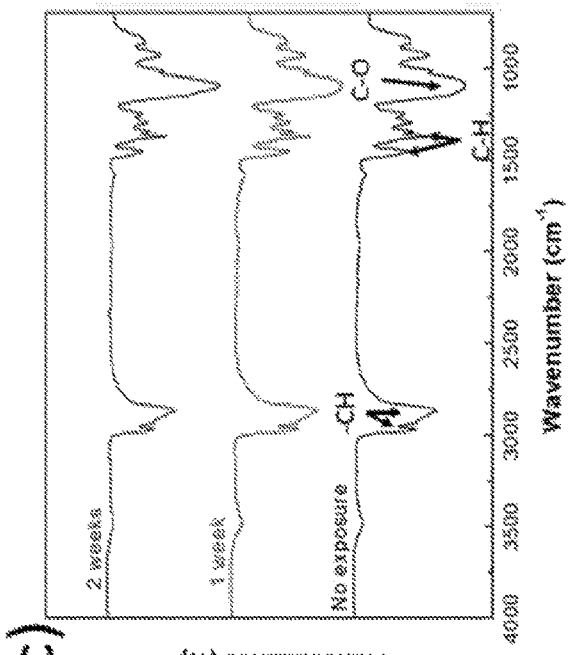
FIG. 15C is a graphical representation of ATR-FTIR spectroscopies of a liquid amphiphilic polymer (P2) UV-exposed for 1-8 weeks.
Figure 15B:
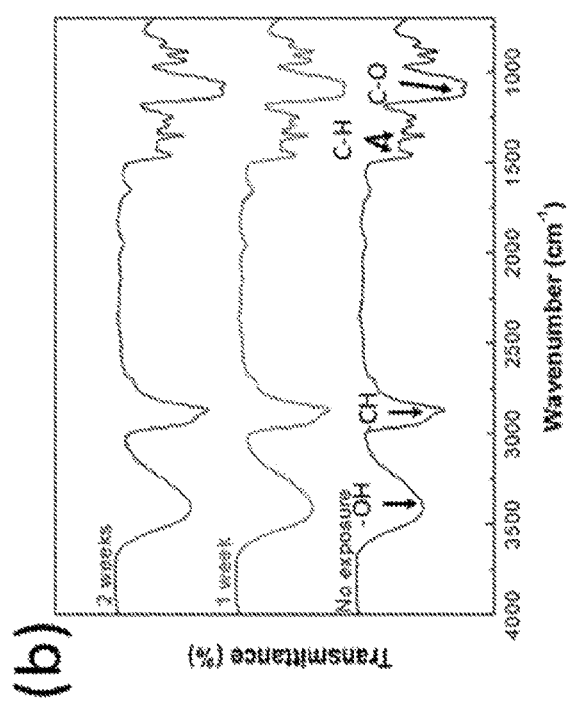
FIG. 15B is a graphical representation of ATR-FTIR spectroscopies of a liquid hydrophilic polymer (P1)

Wind blow tests were repeated in the testing site as follow: 10 sets of wind blowing in a pattern of 10 seconds of blowing, with 50 seconds of settlement for each round. Because of dust from outside of testing areas during the one-week drying process, the sensor detected a significant amount of dust in initial rounds. However, after two or three rounds, the dust generation became stable, depending only upon surface characteristics. The average PM10 values from the last five rounds were calculated in FIGS. 12A and 12B. The testing results of week 1 and week 2 are shown in FIGS. 12A and 12B, respectively. Over time, dust amounts were not changed much with P2 formulations, while dust amounts were increased with Envirotac II that has been used at the testing site mine, P1, and non-treated samples. Based on the field test results, we conclude that the P2 formulation effectively suppresses the tailings dust particles better than any other formulations in our testing.

Figure 13:
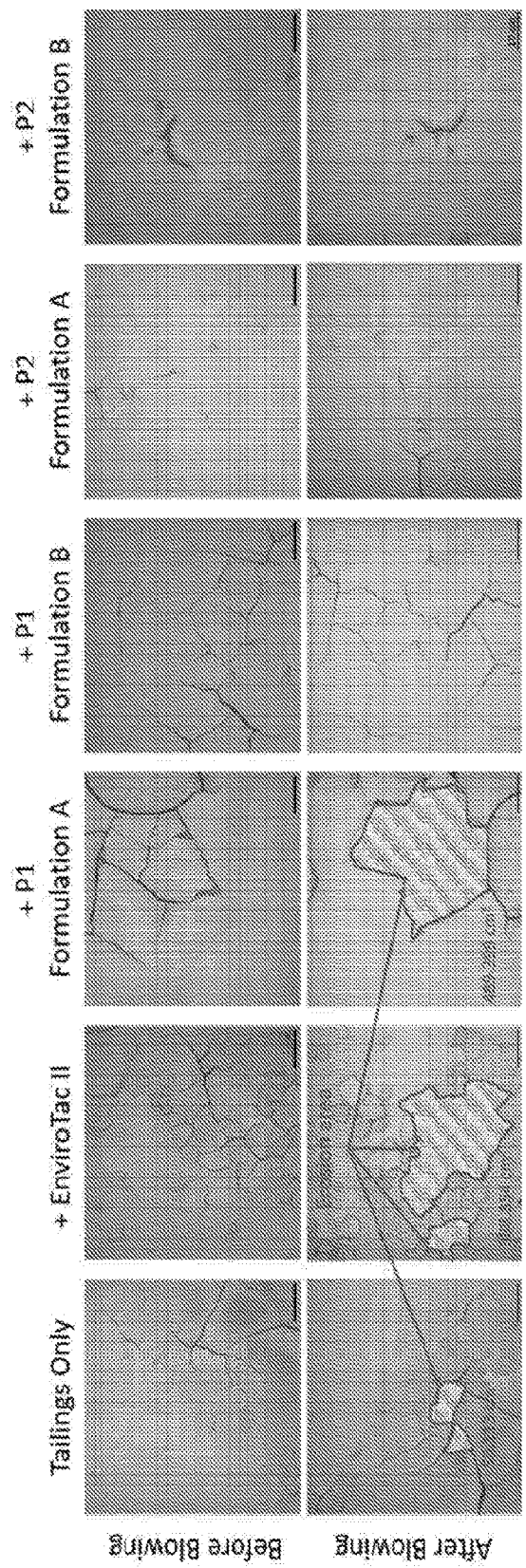
FIG. 13 shows images of desiccation crack formations and wind erosion before and after wind blowing.

During this field test, we observed that P2 polymer formulation reduced the desiccation cracks, the major dust source on the tailings beach surface. FIG. 13 compares the desiccation crack formation on each polymer formulation and shows the impact of dried water and wind erosion to surface crack (FIG. 13) and relevant dust generation (FIGS. 12A and 12B). P2 formulations showed significantly fewer desiccation cracks (FIG. 13) that resulted in lower PM10 dust generation (FIGS. 12A and 12B). The surfaces with Envirotac II and P1 formulations formed a more brittle crust, resulting in less resistance to higher wind speed.

Task 4: Investigation of Polymer Dust Suppression Mechanisms on the Ground to Prepare Effective Polymer Formulations Specific Objective: To Discover and Investigate the Molecular Interaction Between Polymer Formulations and Dust by Using Optical Analysis (SEM-EDS and ATR-FTIR)

In Task 3, the effectiveness of the proposed biocompatible liquid polymers as new dust suppressants was confirmed. The "liquid" polymer was just retained at the tailings bed, leading to effective dust suppression. This phenomenon may be simply occurred by the enhanced wetting status of dust particles by the liquid phase of polymer in an ambient condition. In addition, we observed that the amphiphilic polymers (AP) showed better effectiveness than the hydrophilic polymers (HP), meaning that the polymers' chemical structure might influence the effectiveness physically and chemically.

These findings from the above tasks led us to investigate dust suppression mechanisms between polymers and dust particles that would allow us to develop the most effective and economically feasible dust suppressant using the biocompatible polymers.

To understand the mechanisms, we investigated the microstructure and quantitative atomic composition of the tested samples by using scanning electron microscope-energy dispersive spectroscopy (SEM-EDS). The changes in the chemical bond structures of the samples were analyzed by using attenuated total reflectance-Fourier transform infrared spectroscopy (ATR-FTIR).

EDS analysis is shown in Table 3. Based on the results of the analysis, it was found that the tailings particles were composed of various chemical elements such as silicon, calcium, iron, and aluminum, among others. Most of the elements were presented as oxides because the atomic ratio of oxygen (55.42%) is approximately equal to the sum of any other atomic ratios.

TABLE 3

The chemical compositions of tailings particles analyzed by energy dispersive spectroscopy (EDS) on the carbon substrate.

| Element | Weight % | Weight % Error | Atom % | Atom % Error |
|---|---|---|---|---|
| C | 2.09 | +/−0.44 | 3.90 | +/−0.83 |
| O | 39.63 | +/−0.63 | 55.42 | +/−0.88 |
| Mg | 2.56 | +/−0.10 | 2.35 | +/−0.09 |
| Al | 5.77 | +/−0.16 | 4.78 | +/−0.13 |
| Si | 23.73 | +/−0.14 | 18.91 | +/−0.11 |
| S | 5.05 | +/−0.06 | 3.53 | +/−0.04 |
| K | 3.99 | +/−0.06 | 2.29 | +/−0.03 |
| Ca | 12.66 | +/−0.09 | 7.07 | +/−0.05 |
| Ti | 0.29 | +/−0.04 | 0.14 | +/−0.02 |
| Fe | 3.99 | +/−0.08 | 1.60 | +/−0.03 |
| Pt | 0.24 | +/−0.13 | 0.03 | +/−0.02 |
| Total | 100.00 | | 100.0 | |

If both types of polymers only interact physically with the tailings particles, the effectiveness of dust suppression should be equal. However, the effectiveness of dust suppression was greater with the P2 formulation than with the P1 formulation. It was postulated that there would be a chemical interaction between the P2 and tailings particles because the difference of chemical structure between P1 and P2 is only the methyl group ($CH_3$) in the central chain of P2. In order to verify our hypothesis, the surficial chemical structure of P1, P2 tailings, and mixtures of them were investigated by ATR-FTIR.

Task 5: Polymer Durability

Specific Objective: To Analyze the Degradability of Polymers by UV Light

It is well-known that temperature and ultraviolet (UV) radiation can attack the bonds of polymer structure, resulting in degradation of the product quality. Since the polymer formulations have been developed for surface mines in an ambient condition, the effects of exposing them to sunlight or UV, time-dependent degradation behavior (or durability) of polymers as a function of temperature and UV was investigated.

Task 6: Reproducibility of Data from the Wind Tunnel Testing in Task 3.

Specific Objective: To Repeat the Task 3 Tests to Obtain Statistical Verification.

The laboratory-scale test implemented in Task 3 had some undesirable variables (e.g., wind, rain, tailings dusts from other areas entering the testing area, and sampling variation); all of those extraneous variables often make it difficult to analyze or interpret data. Before the large-scale field testing on the tailings beach and the slope/dike of the tailings dam, additional lab-scale testing was performed to obtain reproducible experimental data and the optimal polymer formulation for a field test. The uncontrolled variables in Task 3 were excluded and adjusted in the lab-scale testing with home-made wind tunnel set-up.

Figure 16:
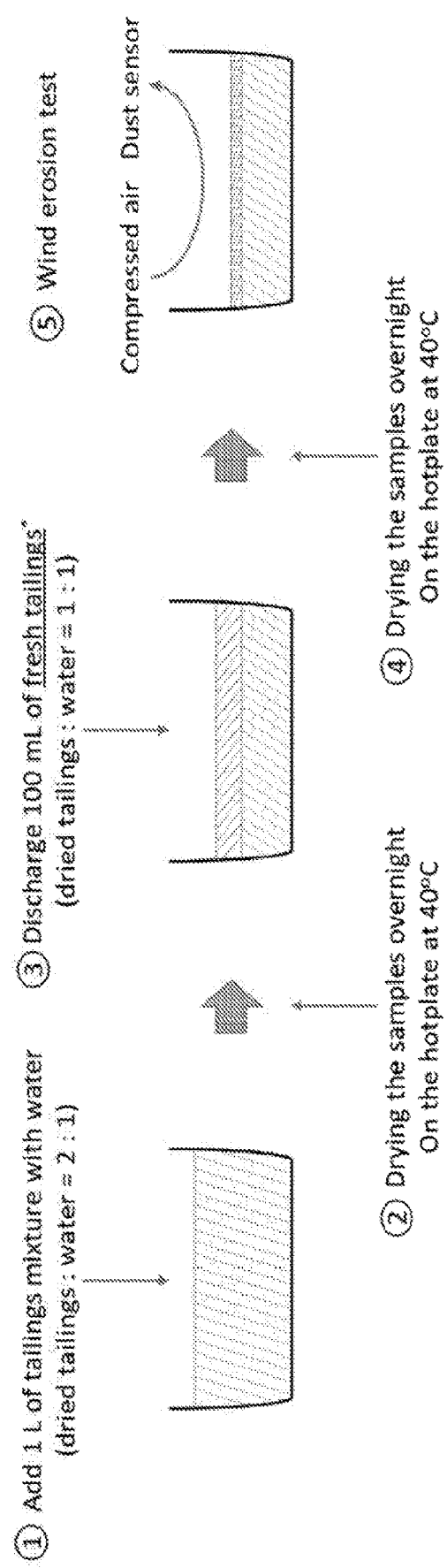
FIG. 16 show illustrations of experimental procedures of wind blowing with a customized wind tunnel set up.

The reproduced wind tunnel testing, reduced its scale and we repeated the tests five times. FIG. 16 shows the detailed procedures. For the sample preparation, 1 L of tailings mixture (dried powder tailings:water=2:1) was added into a 6'×6' metal container. The container was put on the hotplate at 40° C. until it was completely dried. In order to mimic the drainage of fresh tailings while discharging in the field, two layers of tailings beds were made. The polymer formulation was mixed with the second layer. 100 ml of fresh tailings mixture (dried powder tailings:water=1:1) was discharged on the top of the dried tailings; then the samples were dried again. The compressed air struck the surface of the as-prepared samples in the vertical direction for 3 seconds; a dust sensor monitored the concentration of PM10 and PM2.5.

As shown in FIGS. 17A-17D, we found that the P2 formulation was significantly effective for dust suppression, reducing both PM10 and PM2.5 up to approximately 90%, with application of 3% of P2 formulation. While the P1 formulation linearly decreased the amount of PM10 and PM2.5 with increasing P1 concentrations, using 7% of P1 concentration, PM10 and PM2.5 generations decreased by approximately 87% and 76%, respectively. From the results of Task 6, it was concluded that the P2 formulation is more cost-efficient than the P1 formulation, considering the dust suppression efficiency and polymer concentration.

Since the current dust measurement method based on laser diffraction detects the particles of polymer or water vapors as dust particles, the dust generation value is sometimes recorded higher when the concentration of polymer formulation increases. It is believed these recordings were induced by false detection, and additional analysis would be required to understand the exact reason for this phenomenon.

Task 7: Applying Polymer Formulations to Tailings Beach Surface, Slope/Dike of Tailings Dam and Haul Road in a Mine (Large-Scale Field Testing).

Specific Objective: To Find Out the Efficacy of P2 Polymer Formulation as a Dust Suppressant in a Hard Rock Mine.

Figure 18A:
FIG. 18A is an image of the Ray mine and FIG. 18B is an image of the Mission mine used to conduct the field studies.
Figure 18B:
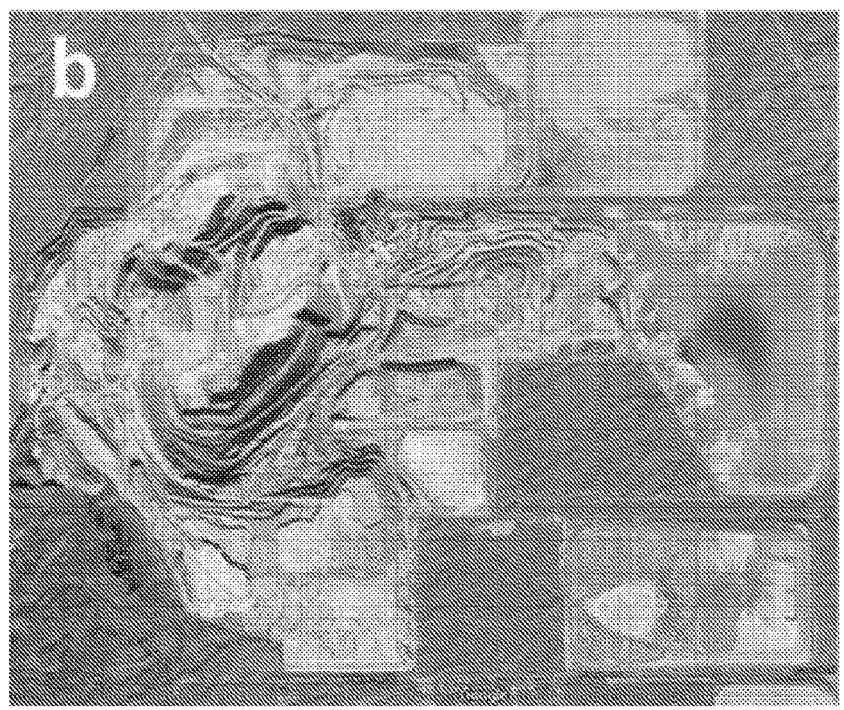
Figure 19:
FIG. 19 is an image of a slope/dike of a mine tailings dam located on Asarco Ray Mine in Kearny, Arizona.

For the large-scale field tests, two mine operations were designated: Ray Mine (FIG. 18A) and Mission Mine (FIG. 18B). In Ray Mine, tests were conducted for the efficacy of the P2 polymer on slope/dike. Ray Mine provided their water truck and 1000 gallons of water, and 60 gallons of P2 formulation were prepared and brought to the testing site. The 60 gallons of prepared P2 formulation was added to the 1000 gallons of water in the tank. The water-P2 mixture was sprayed on the slope/dike of the tailings dam. The tested area on the site is 120×20 ft² as shown in FIG. 19. To monitor dust generation, PM10 and PM2.5 were measured using a SDS-021 dust sensor. The tested area was observed weekly for two weeks; the test procedures were identical to the small-scale field tests, performed in Task 3.

Figure 20A:
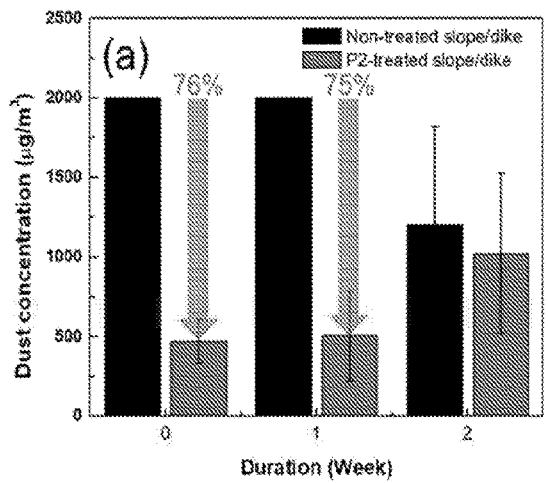
FIGS. 20A and 20B are graphical representations of the respective concentrations of PM10 and PM2.5 generated at the slope/dike of a mine tailing dam over two weeks.
Figure 20B:
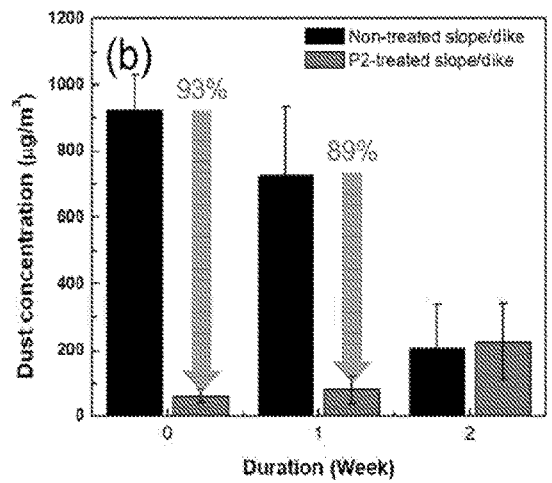

FIGS. 20A and 20B shows PM10 and PM2.5 concentrations measured in the slope/dike of the tailings dam at Ray Mine. The first measurement was carried out after 3 hours of spraying the water-P2 mixture. PM2.5 concentration on the treated area was decreased by 93% compared to the non-treated area. The PM10 concentration was also decreased by 76%. After one, week the first check-up was completed and it was found that the decrease rates were 89% and 75% for PM2.5 and PM10, respectively. After two weeks, the second check-up was completed and the concentration of P2 formulation was found to be diluted due to rain in the testing area; the dust concentration of non-treated and treated areas was not distinguished.

Figure 21A:
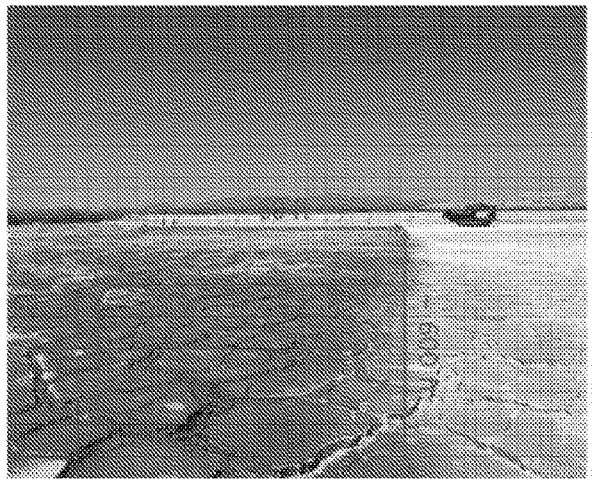
FIGS. 21A and 21B are images showing a mine tailings beach at Mission Mine.
Figure 21B:
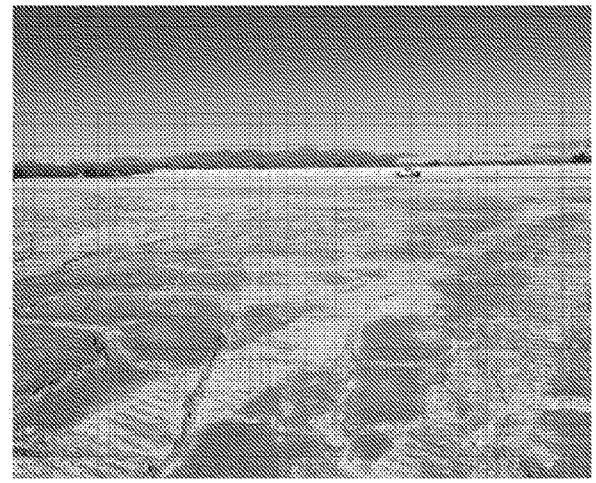
Figures 24A, 24B, 24C:
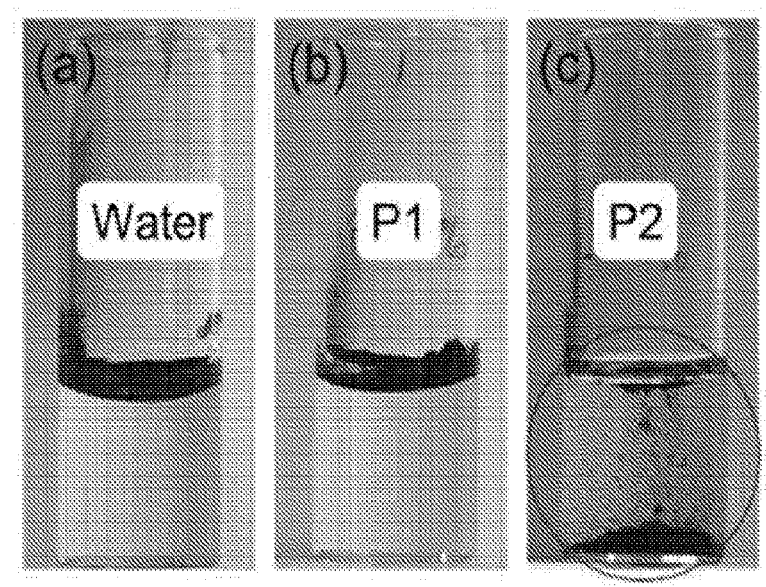
FIGS. 24A-24D show images of coal particle sinking tests and surface tension measurements for water, a liquid hydrophilic polymer solution, and a liquid amphiphilic polymer solution, respectively.
Figure 24D:
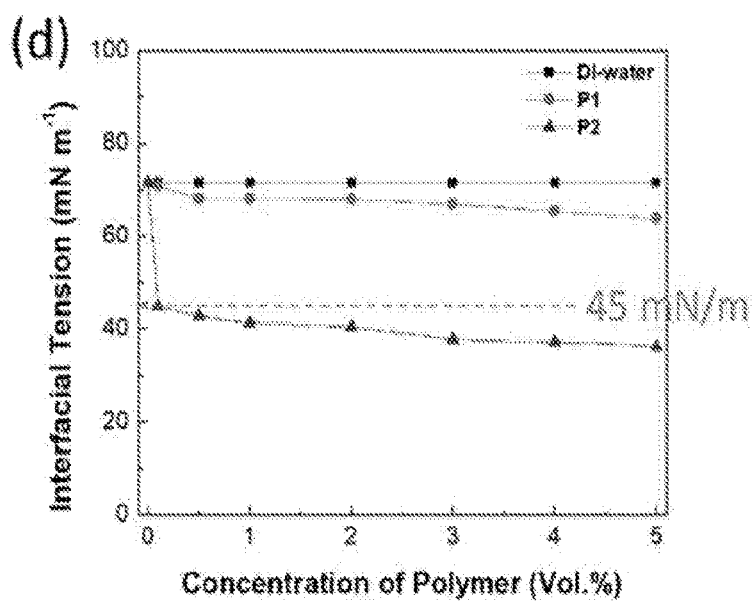

In Mission Mine, the efficacy of the P2 polymer on the tailings beach was tested. The mixture of 1000 gallons of water and 60 gallons of P2 formulation was sprayed onto the tailings beach surface, approximately 36,000 ft$^2$, as shown in FIGS. 21A and 21B. The mine water truck discharged the water-P2 mixture with the spraying rate of 60 gallons per second. The surface of the testing area was arid and rigid, with desiccation cracks; those were present because of the shut-down of the testing site. In the small-scale field test in Task 3, it was observed that a large amount of dust was generated from the cracks on the tailings beach. Since the same phenomenon was also found in the testing area, dust concentration was measured in the crack-rich regions. The testing area was visited twice a week and monitored for PM10 and PM2.5 concentrations.

The detailed test results are shown in FIGS. 22A and 22B. PM10 and PM2.5 concentrations were measured at non-treated and treated regions. The formulation was more effective for PM2.5 than for PM10. The PM2.5 concentration was decreased by 82% after 3 hours of spraying and 78% in the first check-up after the first week. In the case of PM10, the concentration was reduced by 64% after 3 hours of spraying and 59% at the first weekly check-up. Due to rain in the testing area, PM10 and PM2.5 concentrations for the second check-up showed similar values to those of a non-treated area.

Results from Ray and Mission Mines indicated that the P2 formulation was an effective suppressant for tailings dust control under and conditions. The polymer was diluted and removed by rain because P2 is soluble in water.

Task 8: Setting-Up Lab-Scale Chamber to Identify Effective Airborne Coal Dust Suppression.

Specific Objective: To Investigate the Efficacy of the Polymer Formulation by Conducting Coal Particles Sinking Tests and Capturing Tests.

Respiratory system diseases for coal miners, such as pneumoconiosis and silicosis have hitherto been a serious problem in the United States. To relieve such conditions, two aspects of dust suppression were investigated for reducing the dust concentration in the workplace in a coal mine. First, based on the established sensor system for Tasks 3 and 4, the dust measurement chamber system was made to identify dust generation from mining activities. Mining activities refer to the coal downsizing processes, using impact or dynamic loading, that include coal cutting, excavating, and crushing. The Split Hopkinson Pressure Bar (SHPB) was used to provide the impact of dynamic loading on coal samples. Two chambers were set up for collecting fine fragments and dust so the amount could be measured to determine how much of the dusts were generated from the impact loading, as shown in FIG. 23. The SHPB produced an impact wave from high speed impact striker. The propagated wave provided impact loads on the sample and broke it into small segments. While its breakage, fine fragments were generated and circulated through the chambers. The SDS-021 sensor measured the concentration of coal dusts at the outlet of a ventilation fan. It was expected the dust generation data would be obtained in accordance with strain rates or loading rates, which can be helpful to understand the dust generation/prediction in a coal mine.

The second objective was to investigate the effectiveness of the polymer formulation on coal dust control. The production of different characteristics with tailings dust was observed and analyzed. Due to the conflict with water, or hydrophobic characteristics of coal, and the fine size of coal dust particles (<10 μm in diameter), the effectiveness of the current water-only spraying system is limited for suppressing coal dust generation. The water only coal dust suppression system has been challenged for establishment of an acceptable level.

The sinking test shown in FIGS. 24A-24D is a simple method to understand the wettability of the coal particles with the liquid solution. The higher sinking rate of particles indicates the better performance from wetting the dust by the solution. As shown in FIGS. 24A-24D (left), the coal dust particles were added to (a) water, (b) water+P1 formulation, and (c) water+P2 formulation. Compared to water and P1 formulation, the P2 formulation effectively immersed coal particles into the solution, meaning that the lower surface tension of the P2 polymer solution increased the sinking speed and capturability of coal particles. It Is known that the surface tension of a solution is required to be below a value of 45 mN/m in order to capture fine coal particles effectively. The surface tension of P1 and P2 solutions (shown in FIG. 24D) was measured, and the surface tension was sharply decreased from 71.63 mN/m (DI-water) to 44.8 mN/m (with the addition of 0.1% of P2).

Figure 25A:
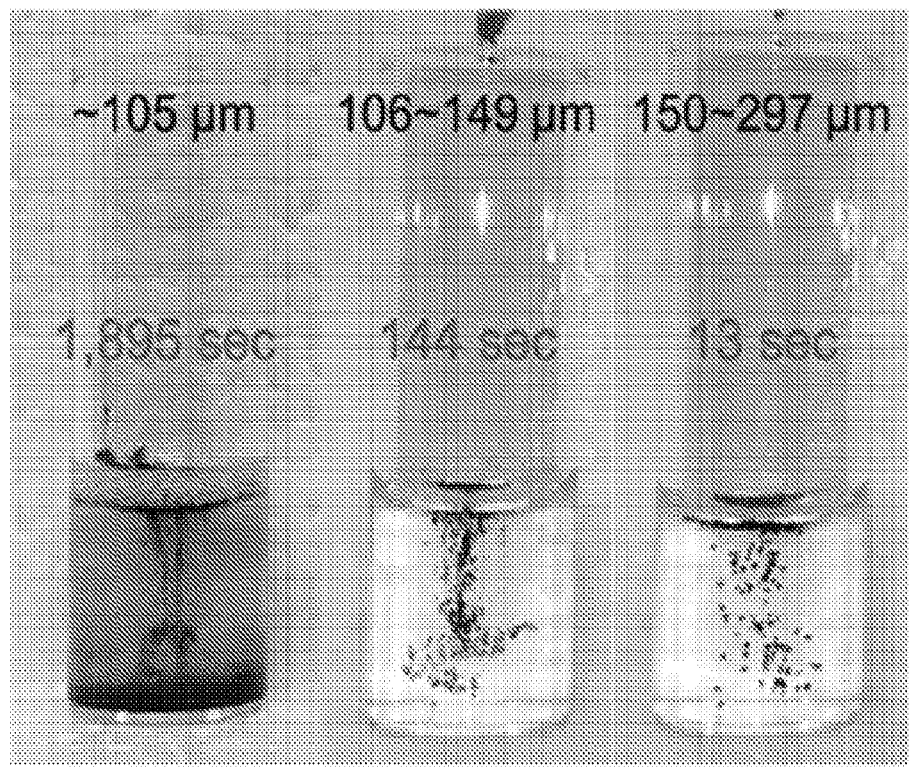
FIG. 25A is an image showing sinking time measurements of various particle size distributions and FIG. 25B is an image showing sinking time measurements of various liquid amphiphilic polymer formulation concentrations.
Figure 25B:
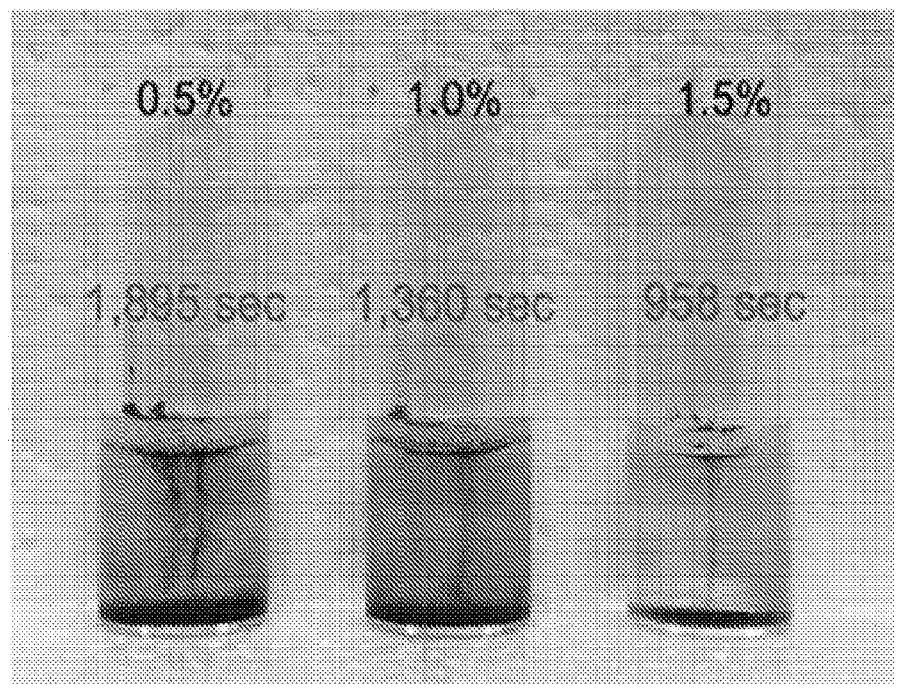

In addition, another sinking test was performed to investigate the effect of particle size distribution and P2 concentration on sinking time (coal wettability). The coal samples were collected from San. Juan Mine, located in New Mexico. The coal samples were crushed and sieved to achieve different-sized coal particles; those treatments made it easier to understand the relationship between the dust size and polymer concentration. 50 mg of the different-sized coal samples were gently added into 2000 μL of P2 formulations. Then the sinking time of each sample was measured until the coal particles completely settled into the bottom of the container, as shown in FIGS. 25A and 25B. Finer particles showed the slower sinking time (FIG. 25A), and the higher P2 concentration (lower surface tension) showed the more rapid sinking time (FIG. 25B).

Figure 26:
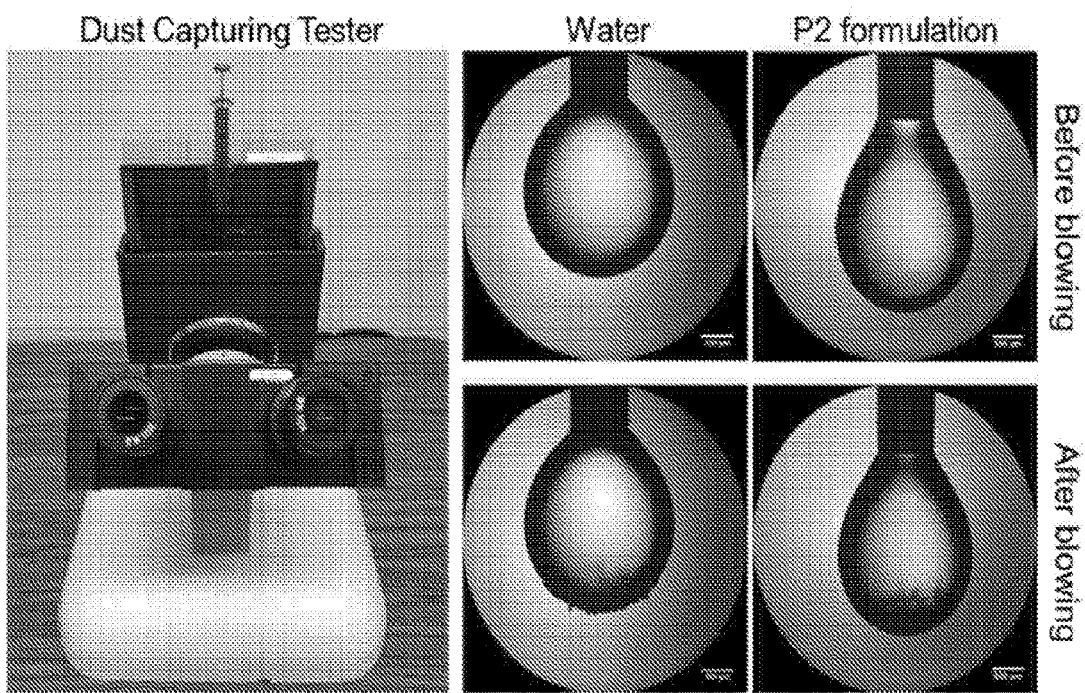
FIG. 26 shows images of a developed dust capturing tester apparatus and various single droplets before and after blowing tests of coal particles with water and water with a liquid amphiphilic polymer formulation, respectively.

Even though the sinking test could be a good indicator in examining the wettability of coal dust by liquid solution, it may not directly relate to the capturing efficiency of the solutions in practice; the capturability also depends on the droplets' geometry that are determined by the spraying system. In Task 8, the test set up the hand-made dust capturing tester (FIG. 26) to quantify the number of coal particles absorbed onto a single water droplet with various polymer concentrations. For that capturing test, a microscope with a camera was used and the dust capturability of the polymer formulations visualized as shown in FIG. 26. In the case of water, the coal particles could not penetrate into the water droplet; these particles just attached onto the surface of the droplet. However, with the P2 formulation, the coal particles were easily immersed within the droplet; that comparison indicated that the P2 formulation had better capturability of coal dust.

Variance in Work and/or Expected Results from the Timeline and Milestones in the Approved Work Plan.

Task 4 (developing new spraying technology) was modified after the consideration of testing site availability, demanded by mine operators, and the given time frame. The modified tasks include (1) dust suppression mechanisms and UV degradation investigation (see attachment 1), (2) laboratory tests for coal dust control applications (see attachment 1), and (3) TSF slope/dike application. The following shows field tests for TSF slope/dike dust control.

Small-Scale Field Tests for TSF Slope/Dike Dust Control

Figure 27:
FIG. 27 is an image showing wind blowing testing on a tailings slope.

The preliminary study was conducted at the lab-scale wind tunnel and at #5 TSF. The polymer solution was sprayed on the slope of tailings stacks and the findings of the dust blowing test are shown in FIG. 27. 500 mL of four solutions (water only, 10% Envirotac II, 5% P1, 5% P2) were sprayed toward a 2 ft×2 ft area on the slope.

The P2 formulation shows a great potential to suppress the dust from a tailings slope/dike. The PM10 dust generation from the polymer-treated tailings surface was measured and, in 2 weeks, we found that the effectiveness of dust suppression maintained with P2 formulation while the dust increased with other formulations, indicating P2 formulation will result in significant cost-saving by reducing the spraying frequency of dust suppressant to tailings dike/slope.

Figure 28:
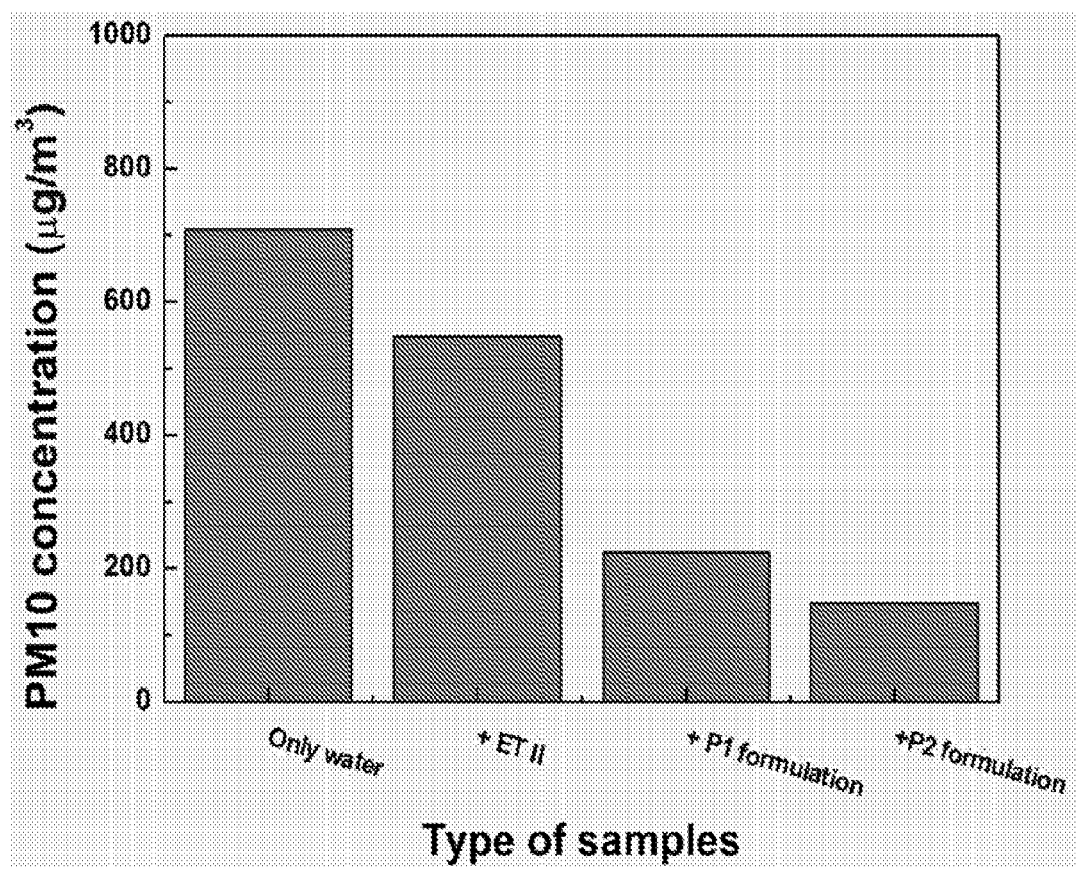
FIG. 28 is a graphical representation showing PM10 generation from tailings slope.

FIG. 28 is a graphical representation of PM10 generation from a tailings slope.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for dust suppression comprising applying a solution including a liquid amphiphilic polymer to dust to establish a degree of particle bonding between the dust and the liquid amphiphilic polymer and maintain the wettability of the dust over time; wherein the degree of particle bonding between the dust and the liquid amphiphilic polymer and wettability of the dust is maintained for at least two weeks, wherein the concentration of said liquid amphiphilic polymers is in the range of greater than about 1% to about 5%, by volume, and wherein the liquid amphiphilic polymer is a Pluronic® poloxamer selected from 25R4, 31R1, L10, L31, L35, L44, L62 LF, and L92 or a Polyethylene glycol (PEG) selected from PEG200, PEG300, PEG400, and PEG600.

2. The method of claim 1, wherein the amphiphilic polymer is an amphiphilic block copolymer.

3. The method of claim 2, wherein the amphiphilic block polymer is PEO-PPO-PEO.

4. The method of claim 1, wherein the liquid amphiphilic polymer solution applied by spraying the dust with the solution.

5. The method of claim 1, wherein the liquid amphiphilic polymer solution applied by intermixing the dust with the solution.

6. The method of claim 1, wherein the liquid amphiphilic polymer solution is in a liquid state at environmental temperature.

7. The method of claim 1, wherein the liquid amphiphilic polymer solution comprises liquid amphiphilic polymer and water.

8. The method of claim 1, wherein a hydrophobic block of the liquid amphiphilic polymer particles is capable of binding to the hydrophobic regions of the dust particles.

9. The method of claim 1, wherein the liquid amphiphilic polymer is biocompatible.

10. The method of claim 1, wherein the liquid amphiphilic polymer is non-ionic.

11. The method of claim 1, wherein the liquid amphiphilic polymer is Pluronic® L62.

12. The method of claim 1, wherein the liquid amphiphilic polymer is Pluronic® L92.

13. The method of claim 1, wherein the liquid amphiphilic polymer is PEG200.

14. The method of claim 1, wherein the liquid amphiphilic polymer is PEG600.

* * * * *